(12) United States Patent
Josefsson et al.

(10) Patent No.: US 12,378,777 B2
(45) Date of Patent: *Aug. 5, 2025

(54) METHOD TO MANUFACTURE A BEVEL ON A BUILDING PANEL AND SUCH BUILDING PANEL

(71) Applicant: Välinge Innovation AB, Viken (SE)

(72) Inventors: Per Josefsson, Ramlösa (SE); Martin Bjeremyr, Helsingborg (SE); Peter Derelöv, Helsingborg (SE); Lucas Larsson, Höganäs (SE)

(73) Assignee: VÄLINGE INNOVATION AB, Viken (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,339

(22) Filed: Sep. 7, 2023

(65) Prior Publication Data
US 2024/0076881 A1  Mar. 7, 2024

(30) Foreign Application Priority Data
Sep. 7, 2022 (SE) .................... 2251038-2

(51) Int. Cl.
*B29C 59/02* (2006.01)
*B32B 3/06* (2006.01)
(Continued)

(52) U.S. Cl.
CPC ...... *E04F 15/02033* (2013.01); *B29C 59/026* (2013.01); *B32B 3/06* (2013.01); *B32B 27/06* (2013.01); *B32B 27/20* (2013.01); *B32B 27/304* (2013.01); *B32B 27/32* (2013.01); *E04F 13/0866* (2013.01); *E04F 13/18* (2013.01);
(Continued)

(58) Field of Classification Search
CPC . B29C 59/02; B29C 59/026; B29C 2795/002; B29D 99/001; B29L 2031/776
USPC ....... 264/129, 234, 293, 345, 348, 442, 481, 264/482, 494
See application file for complete search history.

(56) References Cited

U.S. PATENT DOCUMENTS

| | | |
|---|---|---|
| 2006/0179773 A1 | 8/2006 | Pervan |
| 2011/0041989 A1 | 2/2011 | Anspach et al. |

(Continued)

FOREIGN PATENT DOCUMENTS

| | | |
|---|---|---|
| EP | 3115195 A1 | 1/2017 |
| EP | 4001546 A1 | 5/2022 |
| JP | 2017-227017 A | 12/2017 |
| WO | 2022/106957 A1 | 5/2022 |

OTHER PUBLICATIONS

U.S. Appl. No. 18/243,224, Lucas Larsson, filed Sep. 7, 2023,
(Continued)

*Primary Examiner* — Leo B Tentoni
(74) *Attorney, Agent, or Firm* — Boone IP Law

(57) ABSTRACT

A method to manufacture a bevel at least partly along at least one edge of a building panel, such as a floor panel or wall panel, where the building panel includes a substrate having an inorganic filler of an amount of 50-85 wt % and a polymer-based material. The method including heating at least an edge portion of an edge of the building panel, along which edge the bevel is to be formed, and forming the bevel in the edge portion by applying pressure to the portion, where the bevel is at least partly formed in the substrate.

16 Claims, 16 Drawing Sheets

(51) Int. Cl.
- *B32B 27/06* (2006.01)
- *B32B 27/20* (2006.01)
- *B32B 27/30* (2006.01)
- *B32B 27/32* (2006.01)
- *E04F 13/08* (2006.01)
- *E04F 13/18* (2006.01)
- *E04F 15/02* (2006.01)
- *E04F 15/10* (2006.01)
- *B29D 99/00* (2010.01)
- *B29L 31/00* (2006.01)

(52) U.S. Cl.
CPC .......... *E04F 15/105* (2013.01); *E04F 15/107* (2013.01); *B29C 2795/002* (2013.01); *B29D 99/001* (2013.01); *B29L 2031/776* (2013.01); *B32B 2264/101* (2013.01); *B32B 2264/104* (2013.01); *B32B 2264/2032* (2020.08); *B32B 2270/00* (2013.01); *B32B 2307/302* (2013.01); *B32B 2307/554* (2013.01); *B32B 2607/00* (2013.01); *E04F 13/0894* (2013.01); *E04F 15/02038* (2013.01); *E04F 2201/023* (2013.01); *E04F 2201/043* (2013.01)

(56) References Cited

U.S. PATENT DOCUMENTS

| | | | |
|---|---|---|---|
| 2011/0247285 A1* | 10/2011 | Wybo | B29C 66/12841 264/129 X |
| 2012/0196093 A1* | 8/2012 | Van Vlassenrode | B29C 67/0044 264/161 |
| 2013/0047536 A1 | 2/2013 | Pervan | |
| 2018/0065405 A1 | 3/2018 | Hannig | |
| 2019/0292793 A1 | 9/2019 | Van Vlassenrode et al. | |

OTHER PUBLICATIONS

U.S. Appl. No. 18/243,282, Lucas Larsson, filed Sep. 7, 2023.
International Search Report and Written Opinion received for PCT Patent Application No. PCT/SE2023/050884, mailed on Oct. 20, 2023, 16 pages.
Swedish Official Action issued by the Swedish Patent and Registration Office (PRV) in Swedish Patent Application No. 2251038-2 on Mar. 1, 2023 (11 pages).

* cited by examiner

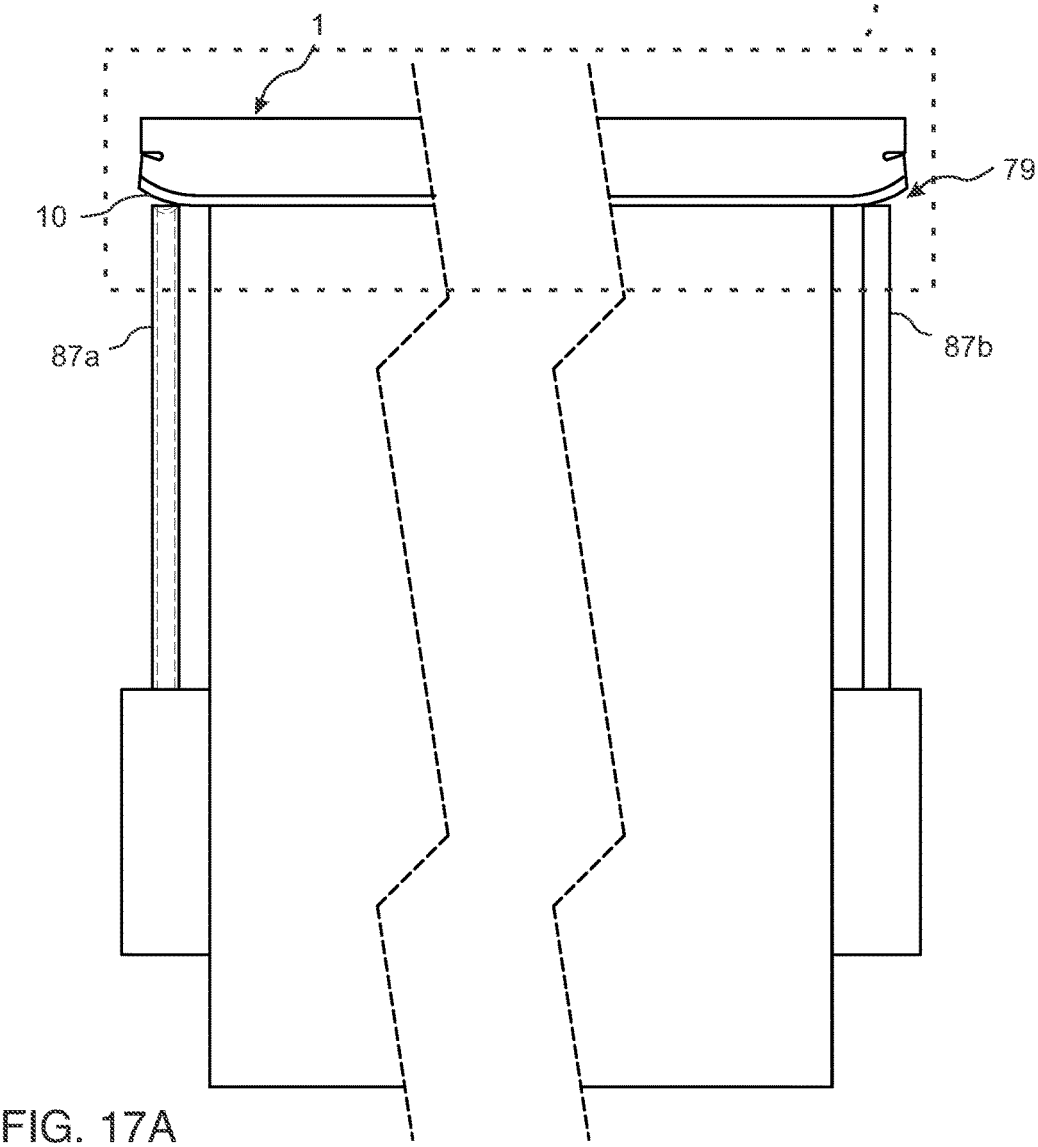
FIG. 17A
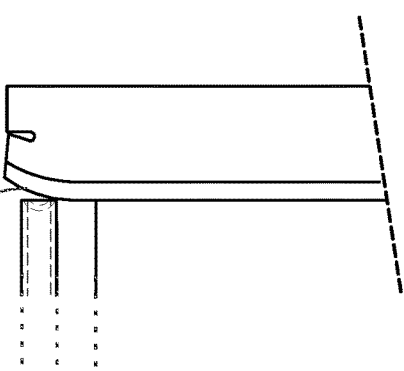
FIG. 17B
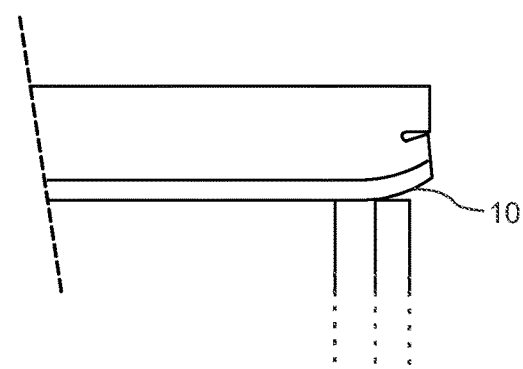

METHOD TO MANUFACTURE A BEVEL ON A BUILDING PANEL AND SUCH BUILDING PANEL

FIELD OF THE INVENTION

The present application relates to the field of building panels and in particular methods of manufacturing a bevel on building panels having a high-filler content.

TECHNICAL BACKGROUND

Building panels such as Luxury Vinyl Tiles (LVT) or Stone Plastic Composite panels (SPC panels) are examples of very popular building panels, especially flooring panels, which have the advantages of being durable and easy to maintain.

A SPC panel is a more rigid panel than a LVT panel, having a modulus of elasticity of 2 000-12 000 MPa often containing inorganic fillers, such as chalk, at an amount of 50-85 wt %. A LVT panel usually has a modulus of elasticity of less than 2 000 MPa since it often contains plasticizer of an amount of 1-20 wt %.

However, known techniques to manufacture a desirable building panel have had difficulties with how to create desirable embossings or bevels on such building panels.

SUMMARY

An object of at least embodiments of the present inventive concept is to provide improvements over known art. This object is achieved by a technique defined herein.

In a first aspect of the present inventive concept there is provided a method to manufacture a bevel at least partly along at least one edge of a building panel, such as a floor panel or wall panel, wherein the building panel comprises a substrate comprising an inorganic filler of an amount of 50-85 wt % and a polymer-based material, and a surface layer, the method comprising:
  heating at least an edge portion of an edge of the building panel, along which edge the bevel is to be formed, and
  forming the bevel in the edge portion by applying pressure to the portion, wherein the bevel is at least partly formed in the substrate.

The bevel may be formed in the edge portion. The bevel may extend at least partly along said at least one edge of the building panel.

The shape and dimensions of the bevel may depend on the thickness of the building panel and/or the total thickness of the surface layer and substrate. In an embodiment the shape and dimensions of the bevel may depend on the dimensions and location of a mechanical locking device as described in more detail below.

The bevel may, in a direction perpendicular to the plane defined by the front surface of the building panel, extends between 0.2 mm and 1 mm. In an embodiment where the building panel has a thinner thickness, e.g., between 2 mm. and 5 mm., the bevel may preferably extend between 0.2 mm. and 0.5 mm. in the direction perpendicular to the front surface of the building panel. In another embodiment where the building panel has a thicker thickness, e.g., between 5 mm. and 10 mm., the bevel may preferably extend between 0.5 mm. and 1 mm. in the direction perpendicular to the front surface of the building panel.

The bevel may further be curved with a radius of between 1 mm. and 10 mm.

The bevel may even further, as explained above, depend on the mechanical locking device. In an embodiment the mechanical locking device extends, in a direction parallel to the plane defined by the front surface of the building panel and into the building panel, further than the bevel does. In an embodiment a tongue groove of the mechanical locking device extends, in a direction parallel to the plane defined by the front surface of the building panel and into the building panel, further than the bevel does. In another embodiment a locking groove of the mechanical locking device extends, in a direction parallel to the plane defined by the front surface of the building panel and into the building panel, further than the bevel does.

Heating at least an edge portion of the building panel may be performed by at least one of an IR heating device, a hot air device, UV heating device, laser device, ultra sound device or contact heat device.

In an embodiment the temperature in the material of the edge portion when forming the bevel is 40-220° C., or 75-180° C. and it may depend on various properties, such as the thickness of the material, the type of material.

In an embodiment the pressure used to form the bevel is 1-50 bar or 1-30 bar, or 1-20 bar. The pressure applied may depend on the temperature in the material when forming the bevel.

In an embodiment the pressing device for forming the bevel may be configured to press a pattern or a structure into the bevel during the forming of such. E.g. it may be desirable to have an embossing in the bevel following a specific pattern in a decorative layer of the surface layer for, e.g., enhancing the decorative layer in the bevel.

A bevel is often formed in edges situated in the top surface of the building panel as the bevel contributes to the aesthetic appearance of the building panel, therefore is the surface of the building panel, as described above, usually the front surface of the building panel. However, it may optionally be the back surface of the building panel.

In an embodiment the method further comprises cooling the bevel. By adding the step of cooling it may become easier to control the elasticity and/or recovery effect of the material/s in the bevel and/or the building panel and in turn control the final appearance of the bevel of the building panel. A further advantage of having a cooling step is that it may provide a broader range of materials which can be used for the building panel, as different material may be prone to elastically go back and/or recover at different temperatures and by adding cooling the elasticity and/or recovery process may be stopped.

Cooling may be applied simultaneously as forming the bevel, or cooling the bevel is separate from forming the bevel.

The cooling may be performed by at least one device using air, water, oil, heat sink or a combination thereof.

The cooling process is preferably an active process in order to shorten the time compared to letting the temperature in the material decrease by means of the surrounding environment. The cooling process may be achieved by a cooling device using air, liquid, gas, solid materials and/or other suitable means. The cooling device may perform the cooling through, e.g., blowing, spraying, evaporation and/or through contact.

The cooling process may be configured to decrease the temperature, in the area of the material where the bevel is formed, between 15% and 40%. Depending on the type of cooling the cooling device uses and the temperature of of such cooling the time spent by the cooling process may vary. For example, if cold water is used the cooling process may take between 2 sec. and 20 sec., and if cold air is used the cooling process may take between 30 sec. and 2 min, all depending on the type of cooling and the temperature.

In an embodiment the substrate comprises a filler of an amount of 60-85 wt %.

In another embodiment the substrate comprises a filler of an amount of 70-85 wt %.

The filler may be an inorganic filler chosen from calcium carbonate ($CaCO_3$), barium sulphate ($BaSO_4$), talc, gas containing elements such as glass bubbles, and/or a combination thereof.

The filler may comprise less than 10 wt % organic material, such as wood-based material or cellulose-based material, or less than 5 wt % organic material, such as 0.5-10 wt %. In an embodiment the filler include 0% organic material.

Further, the substrate may have a thermal conductivity of at least 0.4 W/m K, at least 0.5 W/mK or at least 0.6 W/m K.

In an embodiment the polymer-based material of the substrate is a thermoplastic material.

The thermoplastic material of the substrate may be chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof.

The substrate material may comprise an amount of at least 7 wt %, at least 10 wt % or at least 15 wt % of the thermoplastic material.

The substrate is configured to be at least partly plastically deformable when pressure is applied in order to at least form the bevel of the building panel. In order to make the substrate plastically deformable the material may either include a plasticizer or include at least two different types of polymers as described below.

Thus, the substrate may comprise a plasticizer, chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. The substrate may comprise a plasticizer of an amount of 1-30 wt %, or 2-15 wt %. A plasticizer provides the substrate with desirable formable properties.

An alternative way of creating the desirable formable properties of the substrate material is for the substrate material to comprise at least two different types of polymers. For example the substrate may comprise a material blend comprising a PVC/PVAc co-polymer, where the PVAc content in the material blend of the substrate may be 1-20% and the PVC content in the material blend may be 80-99%.

The substrate may be a single-layer substrate or a multi-layer substrate.

In an embodiment the method further comprises:

creating an indentation in the edge portion of the at least one edge of the building panel, wherein the indentation is located at a distance from a surface of the building panel in which the bevel is to be formed, in a direction substantially perpendicular to the surface of the building panel, prior to the step of heating at least an edge portion.

The indentation may be created at least partly in the substrate.

The indentation may preferably extend, in a direction parallel to the plane defining the front surface of the building panel and into the building panel, the same length as or further than the extension of the intended bevel to be formed.

In an embodiment where a mechanical locking device is to be formed in the building panel, the indentation may preferably extend, in a direction parallel to the plane defining the front surface of the building panel and into the building panel, no further than the mechanical locking device, or even more preferred shorter that then mechanical locking device.

In another embodiment a tongue groove, to be formed, of the mechanical locking device extends, after it has been formed, in a direction parallel to the plane defined by the front surface of the building panel and into the building panel, further in than the indentation does. In yet another embodiment a locking groove, to be formed, of the mechanical locking device extends, after it has been formed, in a direction parallel to the plane defined by the front surface of the building panel and into the building panel, further in than the indentation does. This is preferred since the indentations should not affect either the process of forming the mechanical locking device or the dimensions of such mechanical locking device. Thus, the remaining indentations, after the bevel has been formed, are preferably to be removed during the forming of the mechanical locking device.

In fact, regardless of the final process steps along the edges of the building panel, e.g., calibrating, the remaining indentations, after the bevel has been formed, are preferably to be removed during such final process step. Thus, the indentations may preferably be temporary features of the edge of the building panel which during a final shaping process i.e. a calibrating process, is no longer present in its original shape.

In an embodiment the height of the opening of the indentation, prior to forming the bevel, is about equal to the height of the bevel.

In another embodiment the height of the opening of the indentation, prior to forming the bevel, exceeds the height of the bevel.

In an embodiment the length, in the direction parallel to the front surface of the building panel and into the building panel, of the indentation is about equal to the radius of the bevel.

In an embodiment the length, in the direction parallel to the front surface of the building panel and into the building panel, of the indentation exceeds the radius of the bevel.

The step of creating an indentation in an edge portion may be made by a milling process or any other process suitable for removing material.

In alternative embodiments the indentation may be located at a distance from a surface of the building panel, in a direction substantially perpendicular to the surface of the building panel. If the surface is the front surface of the building panel the distance from the surface of the building panel may preferably correspond to at least the thickness of a surface layer of the building panel. In an embodiment the indentation is arranged in the substrate of the building panel and in an alternative embodiment the indentation is arranged partly in the substrate and partly in the surface layer.

In an embodiment the indentation extends along the entire length of the edge of the building panel in which it is created.

Features and dimensions of the indentations may vary depending on, e.g., the material of the layer in which it is created, the intended dimensions of the bevel or on the intended calibrating process, e.g., if the building panel should include a mechanical locking device.

In an embodiment the step of heating at least an edge portion of an edge of the building panel include heating at least an area between the indentation and the surface of the building panel in which the bevel is to be formed.

In an embodiment the building panel further comprises a surface layer comprising a decorative layer. The decorative layer may be a coloured powder layer, a paper sheet, a polymer-based sheet, a wood-based sheet, a wood veneer, a cork-based sheet, or a fabric, woven or non-woven.

In another embodiment the decorative layer of the surface layer is a printed polymer-based sheet.

Further, the surface layer of the building panel may comprise a wear layer, such as a wear resistant foil, a wear layer having wear resistant particles and/or a lacquered layer and/or a coating layer.

The method may further comprise:
calibrating at least one edge of the building panel after forming the bevel along the at least one edge of the building panel. Calibrating an edge of the building panel may include making finishing process steps to create the final shape and tolerances of the edges, the bevel, and the building panel. Such finishing process steps could be achieved by, e.g., cutting, milling and/or abrasive.

In an embodiment the step of calibrating the edge may include creating an edge surface substantially perpendicular to the front surface of the building panel. Such calibrating could be achieved by, e.g., cutting, milling and/or abrasive.

In an alternative embodiment the step of calibrating the edge may include creating an angled edge surface, where an edge of the front surface preferably protrudes out from a plane, arranged in the edge of the back surface, extending substantially perpendicular to the front surface. I.e., the angled surface is preferably angled in towards the rest of the building panel, from the front surface to the back surface of the building panel.

In an embodiment the edge surface created by the calibrating step may be a continuous surface or a discontinuous surface comprising several sections.

The indentations are preferably temporary features of the edge of the building panel which after the calibrating process is no longer present in its original shape.

The method may further comprise:
creating a mechanical locking device along at least one edge of the building panel, where the mechanical locking device is configured for horizontal and/or vertical locking of similar or essentially identical building panel in an assembled position.

Creating the mechanical locking device may be seen as a further example of calibrating the edge of the building panel.

The mechanical locking device may be arranged along the edges of the building panel. The mechanical locking device may include connecting means such that similar or essentially identical building panels may be locked together. Further, each edge may be provided with similar or different types of connecting means. Preferably, the connecting means arranged on opposite edges of the building panels are compatible with each other. The mechanical locking device may be provided with a first pair of connecting means and a second pair of connecting means. For example, the connecting means of the first pair may be arranged along a first edge and an opposite second edge of the building panel, being compatible with each other. The connecting means of the second pair may be arranged along a third edge and an opposing fourth edge of the building panel, being compatible with each other. In an embodiment the first and second edge may be the long sides of a building panel having a rectangular shape, and the third and fourth edge may be the short sides of such a building panel.

The first pair of connecting means and the second pair of connecting means may be of the same type or be two different types of mechanical locking devices.

In a second aspect of the present inventive concept there is provided a method to manufacturing a building panel, such as a floor panel or wall panel, comprising:
applying a surface layer on a substrate wherein the substrate comprises an inorganic filler of an amount of 50-85 wt % and a polymer-based material,
applying heat and pressure to form the building panel, and
forming a bevel along at least one edge of the building panel with a method according to any one of the embodiments described above.

The pressure applied when forming the building panel may be 5-20 bar.

The temperature applied when forming the building panel may be 120-160° C.

In a third aspect of the present inventive concept there is provided a building panel, such as a floor panel or wall panel, comprising
a substrate comprising an inorganic filler of an amount of 50-85 wt % and a polymer-based material,
a surface layer comprising a decorative layer and a wear layer, and
a bevel extending along at least one edge of the building panel,
wherein the bevel has been manufactured by a method according to any one of embodiments described above.

BRIEF DESCRIPTION OF THE DRAWINGS

Embodiments of the invention will be described in the following: reference being made to the appended drawings which illustrate non-limiting embodiments of how the inventive concept can be reduced into practice.

FIG. 17B is a detailed view of FIG. 17A, FIG. 18A schematically illustrates a side view of a cross section of a building panel after the step of the method illustrated in FIG. 17B according to an embodiment of the inventive concept, FIG. 18B schematically illustrates a side view of the cross section in FIG. 18A after a step of a calibrating method to create a substantially straight surface of the building panel, according to an embodiment of the inventive concept, FIG. 18C schematically illustrates a side view of the cross section in FIG. 18A after a step of a calibrating method to create an angled surface of the building panel, according to an embodiment of the inventive concept.

DETAILED DESCRIPTION OF EMBODIMENTS

Figure 1A:
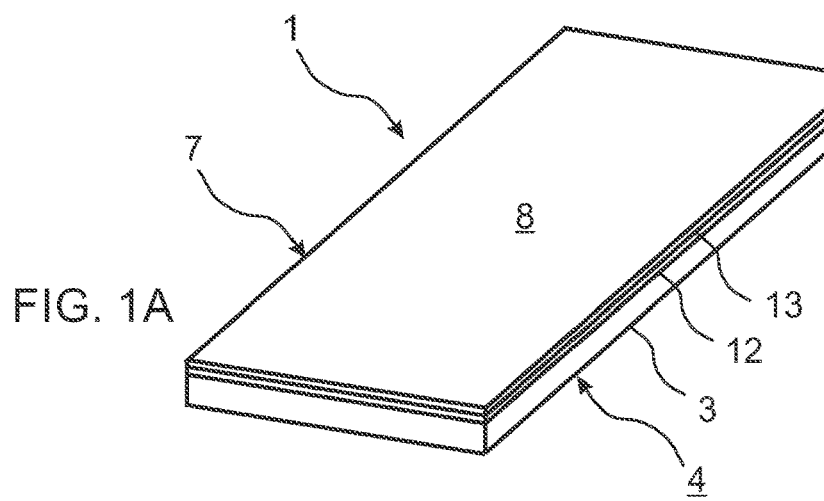
FIG. 1A is a schematic perspective view of a building panel according to an embodiment of the inventive concept.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements. Generally, in this disclosure, terms like "below" or "lower" typically implies closer to the back surface of the panel or a plane thereof, whereas "above" or "upper" implies closer to the front surface or a plane thereof. Further, the thickness direction of the panel is defined as the vertical direction when the panel lays flat on a surface. The horizontal and vertical direction are applicable definition when the building panel is lays flat on e.g. a floor. Instead of horizontal and vertical directions, the description will also refer to a direction substantially parallel with extension of the decorative surface and a direction substantially perpendicular to the extension of the decorative surface. When a building panel is lays flat on e.g. a floor, the horizontal direction is the same as the direction substantially parallel with the extension of the decorative surface and the vertical direction is the same as the direction substantially perpendicular to the extension of the decorative surface.

In this disclosure a plastically deformable substrate is illustrated and discussed. A definition of a plastically deformable layer, used throughout this disclosure, is one where the shape of the layer may be changed under the application of heat and pressure, and the changed shape may be maintained during and after the application of heat and pressure. For example, a bevel, depressions and/or elevations, may be formed in the material of a plastically deformable layer by application of heat and pressure, and the bevel, depressions and/or elevations may be maintained during and after the application of heat and pressure. A plastically deformable layer may be considered sufficiently plastically deformable when, e.g., a depression of 0.04 mm is formed when an embossing plate with a rill of 1.2 mm depth and a base width of 2 mm is pressed against the layer at a pressure of 20 bar and a temperature of 80° C. for 35 seconds. In further embodiments, a plastically deformable layer may be considered sufficiently plastically deformable when, e.g., a depression of 0.06 mm, such as 0.08 mm, such as 0.1 mm, such as 0.12 mm is formed when an embossing plate with a rill of 1.2 mm depth and a base width of 2 mm is pressed against the layer at a pressure of 20 bar and a temperature of 80° C. for 35 seconds.

In other embodiments, a plastically deformable layer may be considered sufficiently plastically deformable when the plastically deformable layer is more plastically deformable than the substrate. That is, a deeper depression is formed in the plastically deformable layer, as compared to a depression formed in the substrate, when each are pressed with an embossing plate with a rill of 1.2 mm depth and a base width of 2 mm at a pressure of 20 bar and a temperature of 80° C. for 35 seconds. For example, the depression in the plastically deformable layer may be at least 10% deeper, such as at least 25% deeper, such as at least 50% deeper than a depression formed in the substrate when each are pressed with an embossing plate with a rill of 1.2 mm depth and a base width of 2 mm at a pressure of 20 bar and a temperature of 80° C. for 35 seconds.

A purpose of the substrate being plastically deformable is to allow easier and/or deeper bevel forming and/or embossing of the building panel during the manufacturing process.

A method to manufacture different layers into a building panel, such as a floor panel or wall panel, which may be used within the inventive concept of this application may be any suitable methods. For example such method may include applying a surface layer on a substrate, wherein the surface layer comprises a decorative layer, and applying pressure to form a building panel. Applying pressure to form a building panel may further comprise applying heat. The method may further comprise applying an adhesive on the substrate before applying the surface layer on the substrate such that the adhesive is arranged in between the substrate and the surface layer, or applying an adhesive on the surface layer before being applied on the substrate such that the adhesive is arranged in between the substrate and the surface layer. In such an application the adhesive may be glue.

Figure 1B:
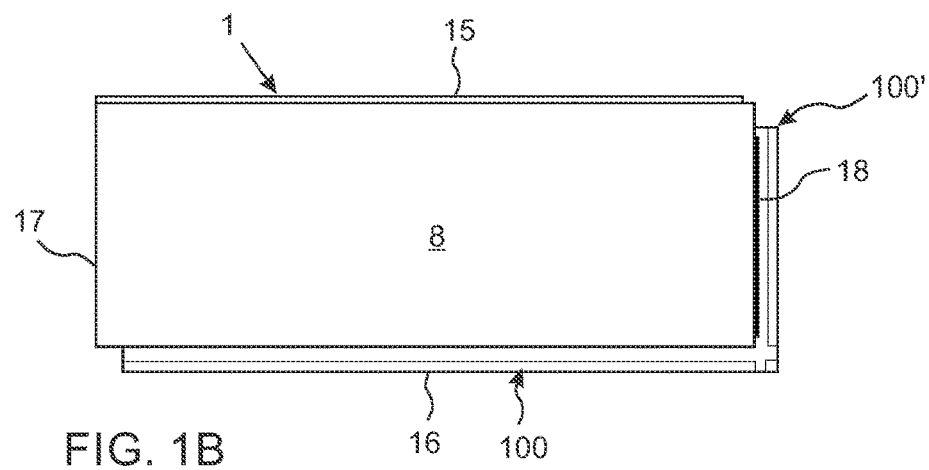
FIG. 1B is a schematic top view of a building panel according to an embodiment of the inventive concept, FIG. 2A schematically illustrates an assembly of a plurality of building panels, FIG. 2B schematically illustrates the finished assembly of FIG. 2A, FIG. 3A schematically illustrates a cross section of two opposite edge portions of two adjacent building panels comprising a mechanical locking device according to an embodiment of the inventive concept for locking the two building panels together, in an unassembled position, FIG. 3B schematically illustrates a cross section of the two opposite edge portions in FIG. 3A, in an assembled position, FIG. 3C schematically illustrates a cross section of the two opposite edge portions in FIG. 3A, during the assembly.

With reference to the figures a building panel 1 is illustrated, see e.g. FIGS. 1A and 1B. The building panel 1 illustrated has a rectangular shape, but may in other embodiments have any other suitable shape, e.g. square, triangular or hexagon. Each building panel 1 has at least a substrate 3 and a surface layer 7.

The substrate 3 is arranged in the back of the building panel 1. A lower side of the substrate 3 forms a back surface 4 of the building panel 1. An upper side of the substrate 3 is attached to the surface layer 7.

The building panel 1 may be a single layer substrate or a multi-layer substrate. A multi-layer substrate may include two or more layers e.g. a core layer, a backing layer, a balancing layer, a reinforcement layer, mineral-based layer, or sound dampening layer.

The substrate is configured to be plastically deformed when at least pressure, preferably also heat, is applied to the substrate 3 or surface layer 7. This is advantageous when e.g. forming a bevel 10 at an edge 15, 16, 17, 18 of the building panel 1 by means of pressing. A method for forming the bevel 10 is described in more detail below.

The substrate 3 may comprise a substrate material including a polymer-based material which preferably is a thermoplastic material. The thermoplastic material may be chosen from a group comprising: polyvinyl chloride (PVC), polyethylene terephthalate (PET), polyvinyl butyral (PVB), polybutylene terephthalate (PBT), polyethylene (PE), polystyrene (PS), polypropylene (PP), polycarbonate (PC), polyvinyl acetate (PVAc), ethylene-vinyl acetate (EVA), polyacrylate methacrylate, polymethylmethacrylate (PMMA), acrylonitrile butadiene styrene (ABS), thermoplastic polyurethane (TPU), and/or a combination thereof. The substrate material may comprise an amount of at least 7 wt %, at least 10 wt % or at least 15 wt % of the thermoplastic material.

The substrate material may preferably comprise less than 10 wt % wood-based material, or less than 5 wt % wood-based material, such as 0.5-10 wt %.

The substrate material may further include at least one or more inorganic filler, such as calcium carbonate ($CaCO_3$), barium sulphate ($BaSO_4$), talc, gas containing elements such as glass bubbles, and/or a combination thereof.

The filler may comprise less than 10 wt % organic material, such as wood-based material or cellulose-based material, or less than 5 wt % organic material, such as 0.5-10 wt %. In an embodiment the filler include 0% organic material.

The substrate comprises a filler of an amount of 50-85 wt %.

Further, the substrate has a thermal conductivity of at least 0.4 W/m K, at least 0.5 W/mK or at least 0.6 W/m K. The higher thermal conductivity in the material the shorter time it takes to heat an area before pressing e.g. a bevel, which makes the manufacturing process more efficient and less time consuming. Below, in Example, are some tests presented showing the correlation between the amount of filler and the thermal conductivity for suitable substrates.

These types of inorganic fillers are especially cost efficient and easy to get a hold of.

The substrate material further includes a plasticizer, preferably chosen from any of the groups of ortho-phthalates, terephthalates, aliphatics, cyclohexanoates, adipates, trimellitates, polyol esters and others, such as DOTP (dioctyl terephthalate), DEHP, DOA, DINP, DOP, ATBC, TOTM or Pevalen®. The substrate material forming the substrate may comprise a plasticizer of an amount of 1-30 wt %, or 2-15 wt %. Having a plasticizer in the substrate material is one way of making the substrate 3 easier to plastically deform under the influence of pressure and preferably heat.

Another way of making the substrate 3 plastically deformable under the influence of pressure and preferably heat, is to include at least two different types of polymers. For example the substrate material may comprise a material blend including a PVC/PVAc co-polymer, where the PVAc content in the material blend of the substrate is 1-20% and the PVC content in the material blend may be 80-99%.

Further, the substrate material may include a plastisol. Plastisol gives the substrate soft and durable properties. A plastisol is a composition of PVC particles suspended in a plasticizer. The plastisol may further include, usually in minor amounts, extenders, stabilizers, pigments and/or filles. The ratio between the PVC particles and the plasticizer may preferably be 50/50 by weight.

In an embodiment the substrate material consists of plastisol.

The substrate 3 preferably has a thickness of 1-10 mm, a thickness of 2-8 mm, or a thickness of 3-7 mm.

The surface layer 7 is arranged above and on the substrate 3. An upper side of the surface layer 7 forms a front surface 8 of the building panel 1.

The surface layer 7 may be a single-layer surface layer or a multi-layer surface layer including two or more layers. Preferably, the surface layer 7 includes at least a decorative layer 12 and a wear layer 13, where the decorative layer 12 is arranged between the substrate 3 and the wear layer 13 and the wear layer 13 is the uppermost layer of the building panel 1.

The decorative layer 12 may be a coloured powder layer, a paper sheet, a polymer-based sheet, a wood-based sheet, a wood veneer, a cork-based sheet or a fabric, woven or non-woven. The decorative layer 12 may also be a printed layer, e.g., a printed polymer-based sheet.

The wear layer 13 may be a wear resistant foil, a wear layer having wear resistant particles and/or a lacquered layer and/or a coated layer. The wear layer is preferably a transparent layer, i.e. a layer which does not affect the appearance of the below arranged decorative layer 12.

FIG. 1B is a top view of a building panel 1 configured to be horizontally and/or vertically locked to similar or essentially identical building panels 1', 1" in an assembling process.

The building panel 1 in FIGS. 1A and 1B is illustrated having a rectangular shape but may in other embodiments have a different shape. However, the building panel 1 includes four edges, the first edge 15, the second edge 16, the third edge 17 and the fourth edge 18. The first edge 15 is arranged opposite the second edge 16 and the third edge 17 is arranged opposite the fourth edge 18.

The front surface 8 and the back surface 4 each extends between the first edge 15 and the opposite second edge 16, and between the third edge 17 and the opposite fourth edge 18. The back surface 4 is substantially parallel to the front surface 8 and spaced apart in a direction substantially perpendicular to the front surface 8.

The building panel 1, as said above, comprises a bevel 10, arranged in an upper portion 20 of the building panel 1, at least along the first and second edge 15, 16, i.e. the long sides of a building panel 1 having a rectangular shape. It may not always be desirable to have a bevel along the short sides of a rectangular building panel, but this is of course optional and likewise possible as having a bevel 10 along the long sides of the building panel 1.

The upper portion 20 is located in at the front of the building panel 1 and may include both the surface layer 7 and at least partly the substrate 3. A bevel may also be arranged along the third and fourth edges if desired. The bevel 10 extends along the entire extension of the edges 15, 16 in which the bevel 10 is arranged. Schematic illustrations of the bevel 10 can be seen in FIGS. 3A-5C.

Further, the building panel 1 includes at least one type of a mechanical locking device 100, 100' configured to lock similar or essentially identical building panels 1, 1', 1" in an assembled position. Such a mechanical locking device 100, 100' is configured to lock said building panels 1, 1', 1" in a vertical and/or horizontal direction, which also can be referred to as directions substantially perpendicular and/or parallel to the back or front surface 4, 8.

In the illustrated embodiments the building panel 1 is provided with two types of mechanical locking devices, a first mechanical locking device 100, arranged along the first and second edges 15, 16, and a second mechanical locking device 100', arranged along the third and fourth edges 17, 18. The first mechanical locking device 100 is designed such that a first edge 15 of a building panel 1 is configured to be assembled and locked to a second edge 16 of an adjacent building panel 1', 1" and the second edge 16 of the building panel 1 is configured to be assembled and locked to a first edge 15 of another adjacent building panel 1', 1" as the building panels are similar or essentially identical. The same applies to the second mechanical locking device 100' where the third edge 17 of the building pane 1 is configured to be assembled and locked to the fourth edge 18 of an adjacent building panel 1', 1" and the fourth edge 18 of the building panel 1 is configured to be assembled and locked to the third edge 17 of another adjacent building panel 1', 1". Thus, the opposite edges of the building panel 1 are designed to be compatible with each other.

Embodiments of a first mechanical locking device 100 are illustrated in FIGS. 3A-3C and 5A-5C. An embodiment of a second mechanical locking device 100' is illustrated in FIGS. 4A-4C.

Figure 2A:
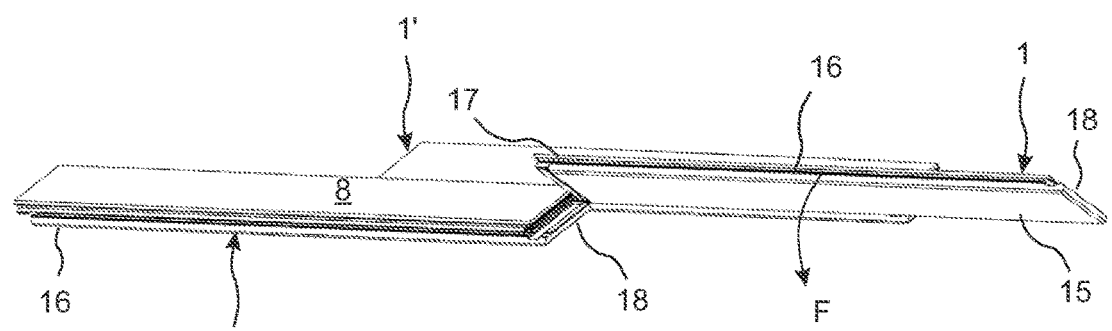
Figure 2B:
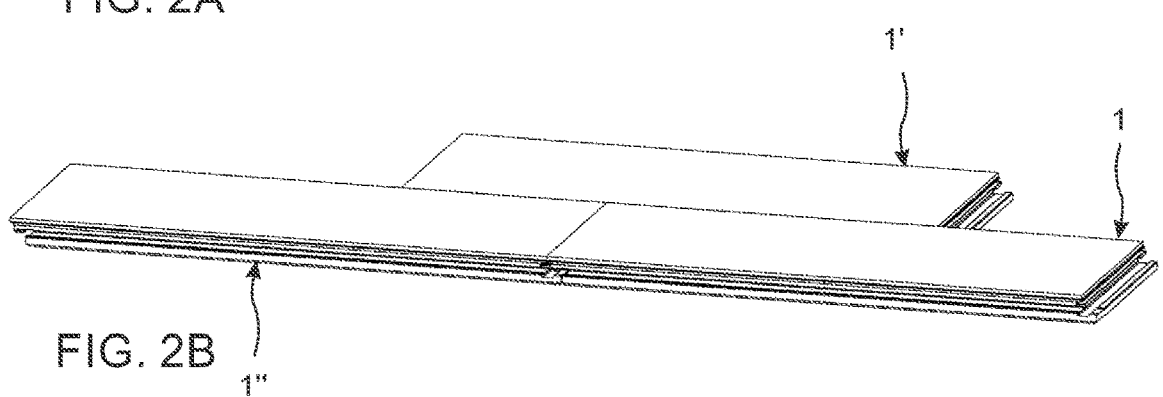

The assembling process of multiple building panels 1, 1', 1" is illustrated in FIGS. 2A and 2B, where a set of building panels 1, 1', 1", such as floor panels, wall panels, ceiling panels, furniture elements or similar, are assembled to each other. A building panel 1 is assembled by firstly arranging its first edge 15 along the second edge 16 of an adjacent building panel 1'. The building panel 1 may preferably be displaced in a direction along the extension of the second edge 16 of the adjacent building panel 1'. After the building panel 1 is displaced into its desired position the first edge 15 of the building panel 1 is, by means of a folding displacement F, locked into the second edge 16 of the adjacent building panel 1' simultaneously as the third edge 17 of the building panel is assembled and locked to a fourth edge 18 of another adjacent building panel 1". The building panel 1 is folded down such that the second edge 16 of the building panel 1 is displaced in a direction substantially perpendicular to the front surface 8 in relation to the first edge 15. The mechanical locking device 100' arranged along the third edge 17 and fourth edge 18 is configured to assemble and lock the adjacent third edge 17 and fourth edge 18 continuously throughout the folding displacement F of the building panel 1.

Figure 3A:
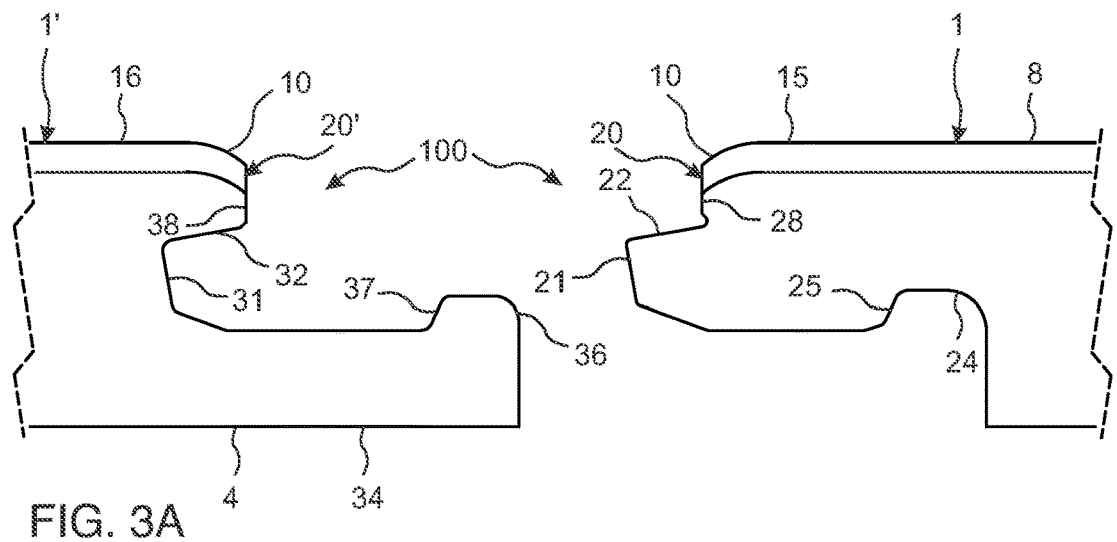
Figure 3B:
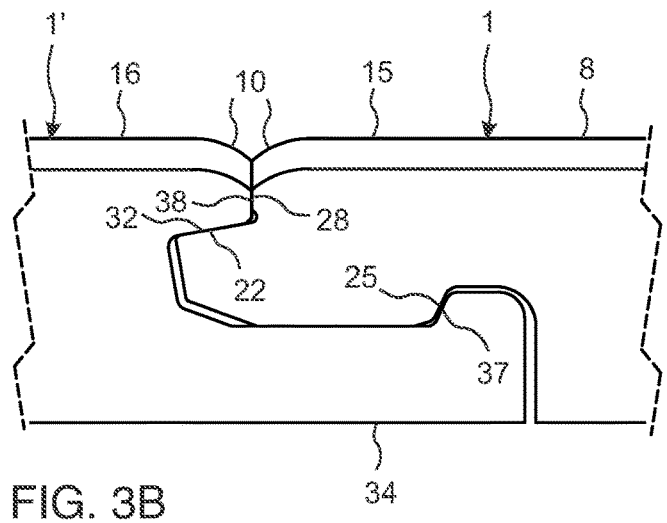
Figure 3C:
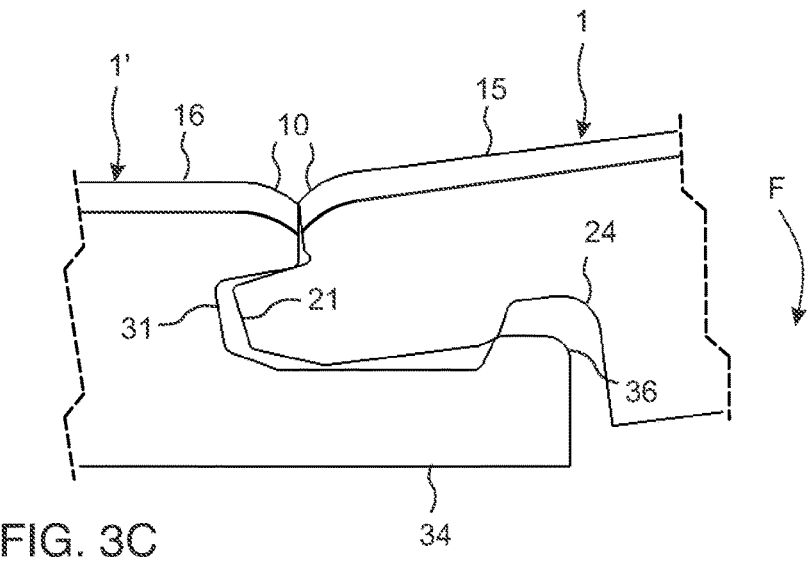
Figure 4A:
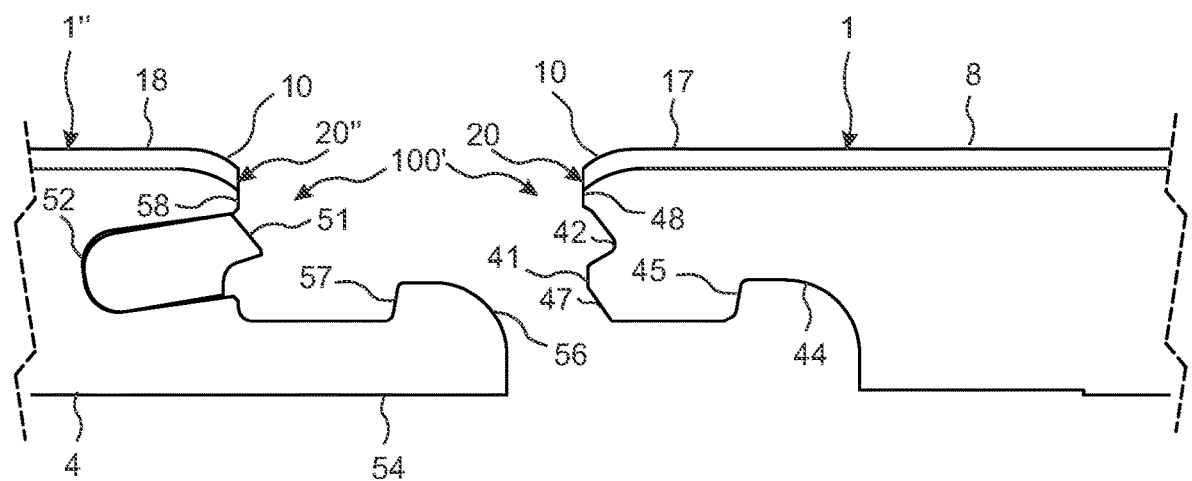
FIG. 4A schematically illustrates a cross section of two opposite edge portions of two adjacent building panels comprising a mechanical locking device according to another embodiment of the inventive concept for locking the two building panels together, in an unassembled position, FIG. 4B schematically illustrates a cross section of the two opposite edge portions in FIG. 4A, in an assembled position, FIG. 4C schematically illustrates a cross section of the two opposite edge portions in FIG. 4A, during the assembly.
Figure 4B:
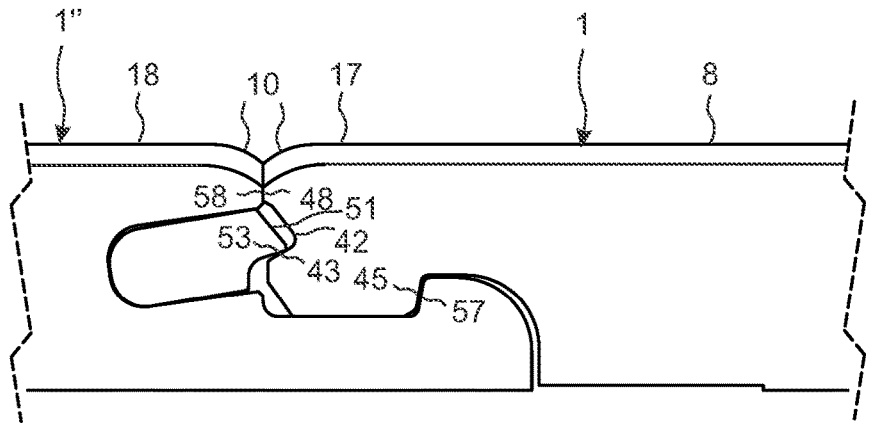
Figure 4C:
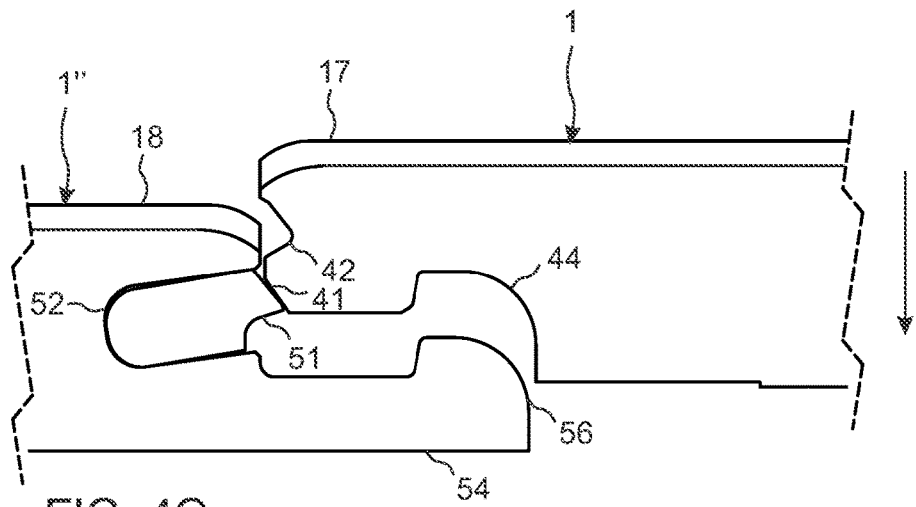

FIGS. 3A, 3B and 3C illustrate a cross section of two opposite edges 15, 16 of two adjacent building panels 1, 1' provided with the first mechanical locking device 100 in an unassembled position, in an assembled position and in a position during the assembly. The two adjacent building panels 1, 1' are assembled by means of the folding displacement as explained above and locked together by means of the mechanical locking device 100. This type of mechanical locking device may be especially advantageous to use along the long sides of a rectangular building panel.

The mechanical locking device 100, at the first edge 15 of the building panel 1, is provided with a locking tongue 21 extending out from the first edge 15. The locking tongue 21 is configured to be received in a tongue groove 31 provided in the second edge 16 of the adjacent building panel 1'. The locking tongue 21 and the tongue groove 31 are configured to lock the two adjacent building panels 1, 1' at least in a direction substantially perpendicular to the front surface 8. In the assembled position an upper surface 22 of the locking tongue 21 is cooperating or even in contact with an upper surface 32 of the tongue groove 31, where the two surfaces 22, 32 creates the lock in at least a direction substantially perpendicular to the front surface 8.

Below the upper surface 32 of the tongue groove 31, seen from the front surface 8, there is provided a locking strip 34 extending out from the second edge 16 of the adjacent building panel 1'. At an outermost end of the locking strip 34 there is provided a locking element 36. The locking element 36 is configured to be received in a locking groove 24 provided at the first edge 15 of the building panel 1. The locking element 36 and the locking groove 24 are configured to lock the two adjacent building panels 1, 1' at least in a direction substantially parallel to the front surface 8. In the assembled position a locking surface 25 of the locking groove 24 is cooperating or even in contact with a locking surface 37 of the locking element 36, where the two locking surfaces 25, 37 creates the lock in at least a direction substantially parallel to the front surface 8.

In the upper edge portion 20, 20' of each building panel 1, 1' there are provided another two locking surfaces 28, 38.

The locking surfaces 28, 38 are, in the assembled position, arranged opposite each other, cooperating or even in contact with each other in order to lock the two adjacent building panels 1, 1' in a direction substantially parallel to the front surface 8. Preferably the two locking surfaces 28, 38 create a tight seal in the assembled position. A tight seal has several advantages, such as mitigating the risk of dirt or fluids entering down into the mechanical locking device 100 which could damage the building panels 1, 1', or such as creating a desirable transition between two adjacent building panels 1, 1' in which also the bevel 10 may be favourable. Creating a desirable transition between the adjacent building panels 1, 1' may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface décor when multiple building panels 1, 1', 1" are assembled to create a panel board, e.g. a floor, wall or the like.

The two locking surfaces 28, 38 extend in a direction substantially perpendicular to the front surface 8. The two locking surfaces 28, 38 are the uppermost pair of locking surfaces of the two adjacent building panels 1, 1' in the assembled position.

FIGS. 4A, 4B and 4C illustrate a cross section of two opposite edges 17, 18 of two adjacent building panels 1, 1" provided with the second mechanical locking device 100' in an unassembled position, in an assembled position and in a position during the assembly. The two adjacent building panels 1, 1" are assembled by means of the folding displacement and the continuous vertical displacement of the second edge 16 in relation to the first edge 15 as explained above, and locked together by means of the mechanical locking device 100'. This type of mechanical locking device may be especially advantageous to use along the short sides of a rectangular building panel or for square tiles.

The mechanical locking device 100', at the third edge 17 of the building panel 1, is provided with a locking tongue 41 provided with a tongue groove 42. The tongue groove 42 is configured to receive a displaceable locking tongue 51 arranged in a displaceable tongue groove 52 in the fourth edge 18 of the adjacent building panel 1", in the assembled position. The displaceable locking tongue 51 and the tongue groove 42 are configured to lock the two adjacent building panels 1, 1" at least in a direction perpendicular to the front surface 8.

The displaceable locking tongue 51 may be separate from the rest of the mechanical locking device 100' and arranged within the displaceable tongue groove 52 e.g. by hand or a machine when before or during the assembly of building panels 1, 1', 1". The displaceable locking tongue 51 is configured to be displaced, by being at least partly flexible, within the displaceable tongue groove 52 as the locking tongue 41 at the third edge of the building panel 1 is displaced down, in a direction perpendicular to the front surface 8, towards the assembled position, see FIG. 4C. When the displaceable locking tongue 51 reaches the tongue groove 42 it snaps into a locked position, see FIG. 4B, and locks the two adjacent building panels 1, 1" at least in a direction perpendicular to the front surface 8. In the assembled position a lower locking surface 43 of the tongue groove 42 is cooperating or even in contact with a lower locking surface 53 of the displaceable locking tongue 51, where the two locking surfaces 43, 53 creates a lock of the assembled panels 1, 1" in at least the direction perpendicular to the front surface 8.

Below the displaceable tongue groove 52, seen from the front surface 8, there is provided a locking strip 54 extending out from the fourth edge 18 of the adjacent building panel 1". At an outermost end of the locking strip 54 there is provided a locking element 56. The locking element 56 is configured to be received in a locking groove 44 provided at the third edge 17 of the building panel 1. The locking element 56 and the locking groove 44 are configured to lock the two adjacent building panels 1, 1" at least in a direction substantially parallel to the front surface 8. In the assembled position a locking surface 45 of the locking groove 44 is cooperating or even in contact with a locking surface 57 of the locking element 56, where the two locking surfaces 45, 57 creates the lock in at least the direction substantially parallel to the front surface 8.

In the upper edge portion 20, 20" of each building panel 1, 1" there are provided another two locking surfaces 48, 58. The locking surfaces 48, 58 are, in the assembled position, arranged opposite each other, cooperating or even in contact with each other in order to lock the two adjacent building panels 1, 1" in a direction substantially parallel to the front surface 8. Preferably the two locking surfaces 48, 58 creates a tight seal in the assembled position. A tight seal has several advantages, such as mitigating the risk of dirt or fluids entering down into the mechanical locking device 100' which could damage the building panels 1, 1', or such as creating a desirable transition between two adjacent building panels 1, 1" in which also the optional bevel 10 may be favourable. Creating a desirable transition between the adjacent building panels 1, 1" may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface décor when multiple building panels 1, 1', 1" are assembled to create a panel board, e.g. a floor, wall or the like.

The two locking surfaces 48, 58 extend in a direction substantially perpendicular to the front surface 8. The two locking surfaces 48, 58 are the uppermost pair of locking surfaces of the two adjacent building panels 1, 1" in the assembled position.

Figure 5A:
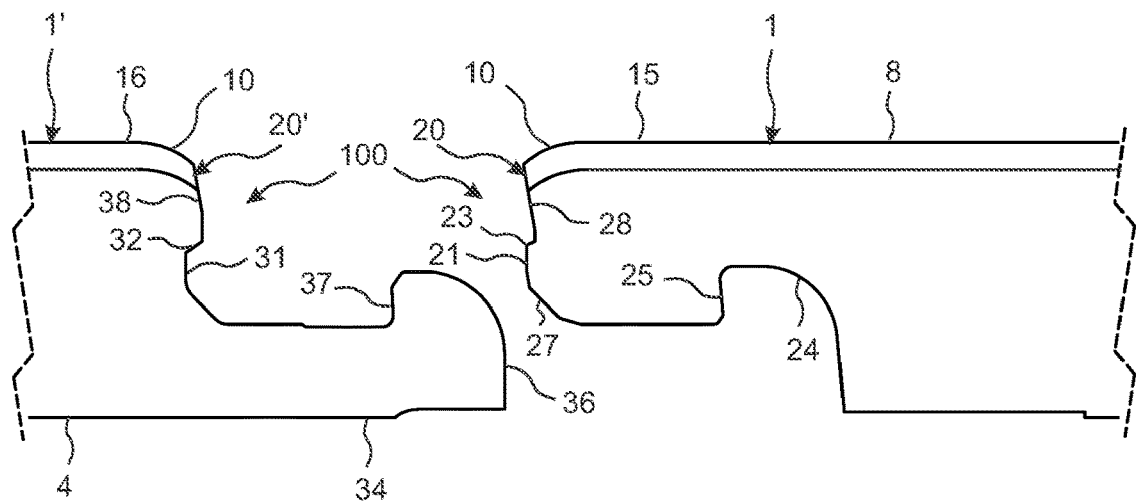
FIG. 5A schematically illustrates a cross section of two opposite edge portions of two adjacent building panels comprising a mechanical locking device according to yet another embodiment of the inventive concept for locking the two building panels together, in an unassembled position, FIG. 5B schematically illustrates a cross section of the two opposite edge portions in FIG. 5A, in an assembled position, FIG. 5C schematically illustrates a cross section of the two opposite edge portions in FIG. 5A, during the assembly, FIG. 6 schematically illustrates a side view of a cross section of a building panel prior to creating the intended edges of a finished building panel, FIG. 7A schematically illustrates a first step of a method to create the intended edges of a building panel, according to an embodiment of the inventive concept.
Figure 5B:
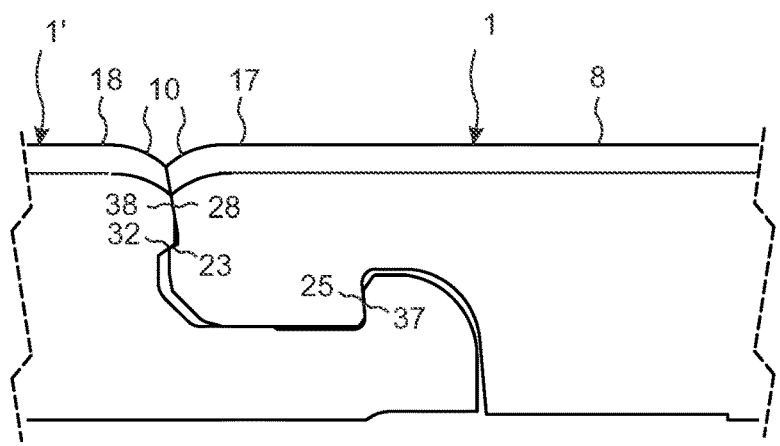
Figure 5C:
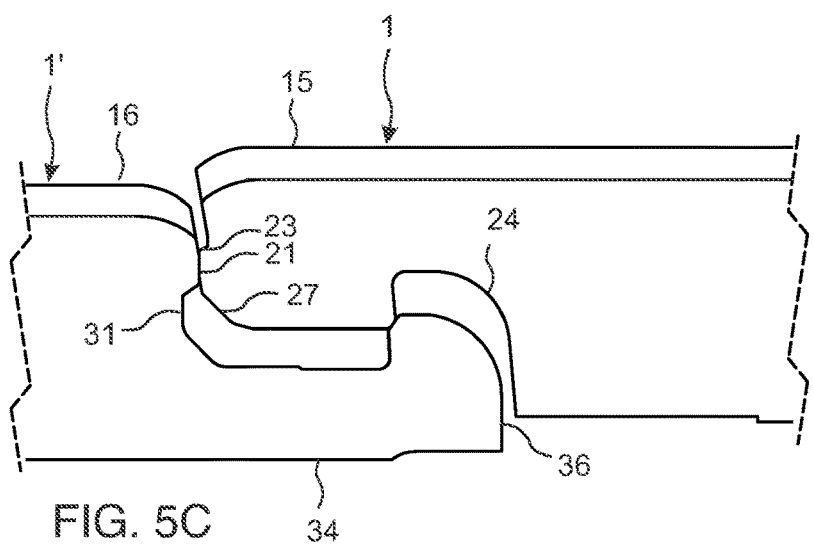

FIGS. 5A, 5B and 5C illustrate a cross section of two opposite edges 15, 16 of two adjacent building panels 1, 1' provided with an alternative first mechanical locking device 100 in an unassembled position, in an assembled position and in a position during the assembly. With this alternative mechanical locking device 100 the two adjacent building panels 1, 1' are assembled by means of a vertical displacement, instead of a folding displacement, of the building panel 1 in relation to the adjacent building panel 1'.

The mechanical locking device 100, at the first edge 15 of the building panel 1, is provided with a locking tongue 21 having a ridge 23. The ridge 23 is configured to receive an upper surface 32 of a tongue groove 31 provided in the second edge 16 of the adjacent building panel 1'. The ridge 23 and the upper surface 32 of the tongue groove 31 are configured to lock the two adjacent building panels 1, 1' at least in a direction perpendicular to the front surface 8. When the ridge 23 reaches the upper surface 32 of the tongue groove 31 it snaps into a locked position, see FIG. 5B, and locks the two adjacent building panels 1, 1' at least in a direction perpendicular to the front surface 8.

In the assembled position the ridge 23 of the locking tongue 21 is cooperating or even in contact with the upper surface 32 of the tongue groove 31, creating the lock in at least a direction perpendicular to the front surface 8.

Below the upper surface 32 of the tongue groove 31, seen from the front surface 8, there is provided a locking strip 34 extending out from the second edge 16 of the adjacent building panel 1'. At an outermost end of the locking strip 34 there is provided a locking element 36. The locking element 36 is configured to be received in a locking groove 24 provided at the first edge 15 of the building panel 1. The locking element 36 and the locking groove 24 are configured to lock the two adjacent building panels 1, 1' at least in a direction substantially parallel to the front surface 8. In the assembled position a locking surface 25 of the locking groove 24 is cooperating or even in contact with a locking surface 37 of the locking element 36, where the two locking surfaces 25, 37 creates the lock in at least a direction substantially parallel to the front surface 8.

In the upper edge portion 20, 20' of each building panel 1, 1' there are provided another two locking surfaces 28, 38. The locking surfaces 28, 38 are, in the assembled position, arranged opposite each other, cooperating or even in contact with each other in order to lock the two adjacent building panels 1, 1' in a direction substantially parallel to the front surface 8. Preferably the two locking surfaces 28, 38 create a tight seal in the assembled position. A tight seal has several advantages, such as mitigating the risk of dirt or fluids entering down into the mechanical locking device 100 which could damage the building panels 1, 1', or such as creating a desirable transition between two adjacent building panels 1, 1' in which also the bevel 10 may be favourable. Creating a desirable transition between the adjacent building panels 1, 1' may be especially desirable if a decorative layer of the surface layer 7 is a printed layer of any material since the printed layer then can transition into the adjacent printed layer without a gap, which could interrupt the decorative surface. An interruption in the decorative surface could create an undesirable surface décor when multiple building panels 1, 1', 1" are assembled to create a panel board, e.g. a floor, wall or the like.

The two locking surfaces 28, 38 extend in a direction substantially perpendicular to the front surface 8. The two locking surfaces 28, 38 are the uppermost pair of locking surfaces of the two adjacent building panels 1, 1' in the assembled position.

An advantage with having a pressed bevel 10 as described herein in combination with a mechanical locking device 100 as illustrated in FIGS. 4A-4C and 5A-5C, where the building panels 1, 1', 1" are assembled by a substantially vertical displacement, is that the bevel 10 may act as a guiding surface for an angled surface 27, 47 of the locking tongue 21, 41. This may occur when the building panel 1 to be assembled is arranged slightly overlapping the adjacent building panel 1', 1". The pressed bevel 10 with its seamless surface may then provide a smooth sideway movement of the building panel 1 such that the building panel 1 to be assembled is displaced in the correct position.

Figure 6:
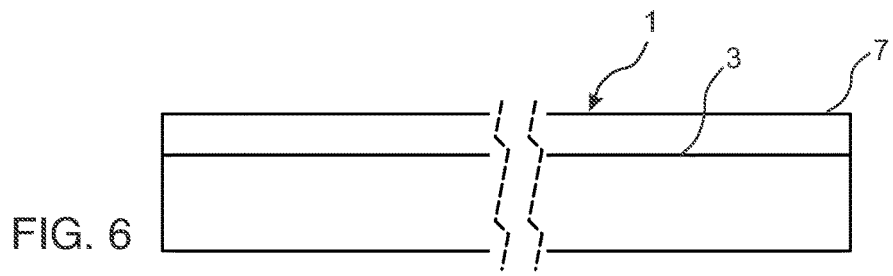
Figure 7A:
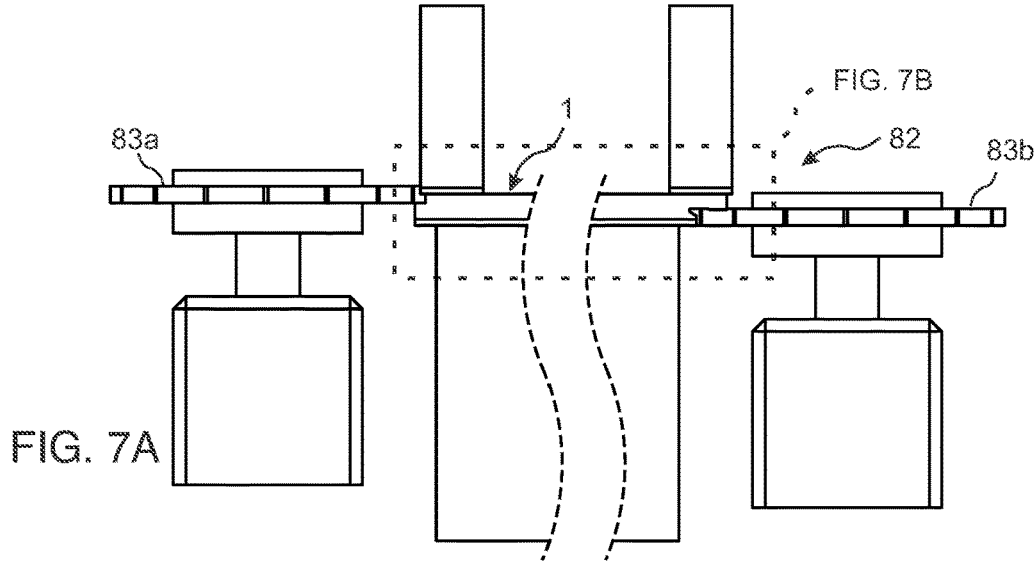
FIG. 7B is a detailed view of FIG. 7A, FIG. 7C schematically illustrates a side view of a cross section of the building panel after the first step in FIG. 7A, FIG. 8A schematically illustrates a second step of a method to create the intended edges of a building panel, according to an embodiment of the inventive concept.
Figure 7B:
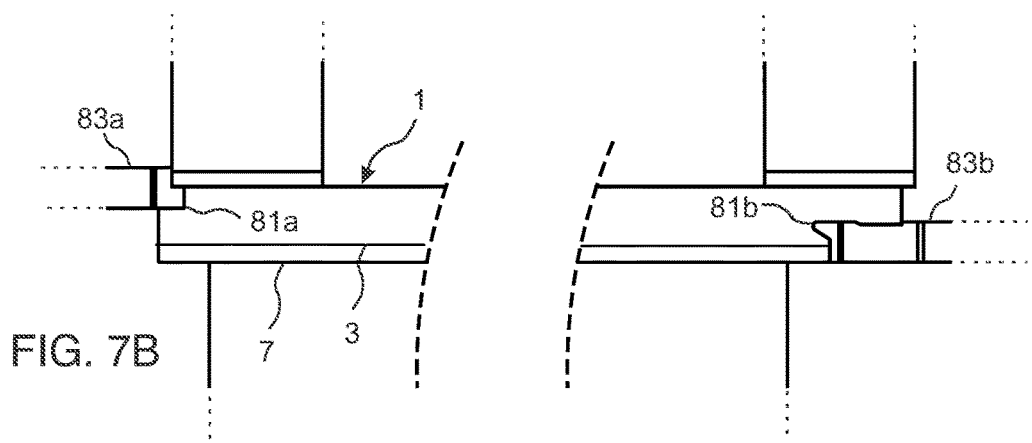
Figure 7C:
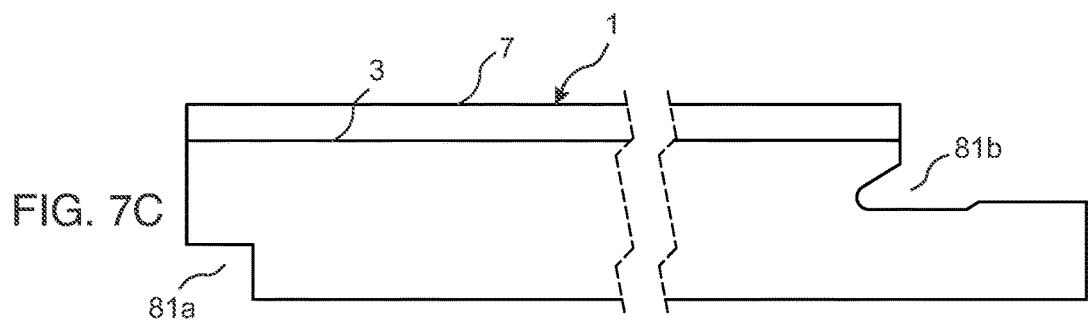
Figure 8A:
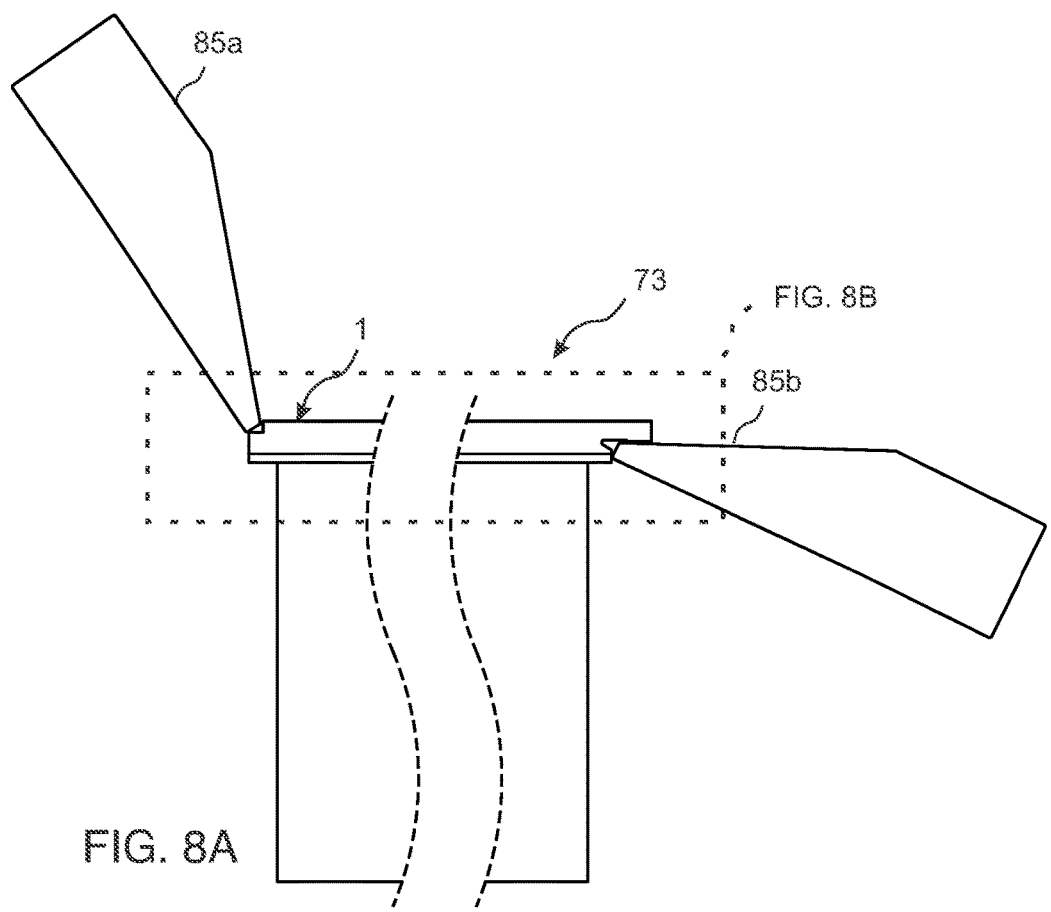
FIG. 8B is a detailed view of FIG. 8A, FIG. 9A schematically illustrates a third step of a method to create the intended edges of a building panel, according to an embodiment of the inventive concept.
Figure 8B:
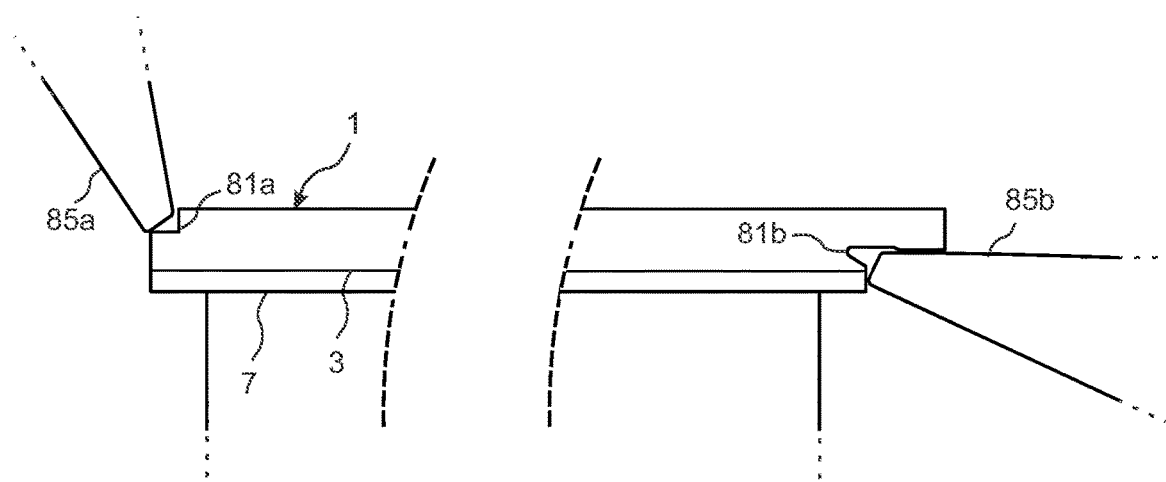

FIGS. 6-13C illustrate different steps of a possible set up for processing the edges 15, 16, 17, 18 of a building panel 1, where FIG. 6 illustrate a building panel 1 with the substrate 3 and the surface layer 7 after being joined together by pressure and preferably also heat. FIGS. 14A-17B illustrate steps of another possible set up for processing the edge 15, 16, 17, 18 of a building panel 1.

The set up for a final processing of the edges 15, 16, 17, 18 of a building panel 1 illustrated in FIGS. 6-13C and FIGS. 14A-17B is particularly advantageous when the building panel 1 has a substrate 3 which is plastically deformable under pressure.

It is possible to form a bevel 10 along edges of the building panel 1 directly after the building panel 1 has been formed by means of pressure and preferably also heat but in order to mitigate the forming of the bevel 10 even further a process of creating an indentation 81a, 81b is performed. Two possible ways of creating an indentation 81a, 81b are illustrated in FIGS. 7A-7C and 14A-14C.

In the processes the building panel 1 is placed in or transported to, preferably by means of a conveyor belt, a milling process 82. The building panel 1 is often processed with its substrate 3 facing upwards and its surface layer 7 facing downwards, but it may of course be processed the other way around in an alternative embodiment, with its substrate 3 facing downwards and its surface layer 7 facing upwards.

A milling device 83a, 83b is arranged on each side of the building panel 1. The milling devices 83a, 83b are configured to each create an indentation 81a, 81b along the edges 15, 16 of the building panel 1 in which the bevels 10 are to be formed. The milling devices 83a, 83b may also be configured to create an indentation 81, 81b suitable for the type of mechanical locking device 100, 100' later created in the edges. A purpose to do so is that the indentation 81a, 81b then will not affect or interfere with the proportions, shapes, and functions of the later created mechanical locking device 100, 100', see FIGS. 13A-13C.

Advantages of creating the indentations 81a, 81b before forming the bevel 10 are that space is created for material to be displace during the pressing and forming of the bevel, decreasing the risk of unwanted excess material gathering which later has to be removed, and decreasing the tendency of the material to elastically go back and/or recover and changing the properties and shape of the bevel 10.

Figure 13A:
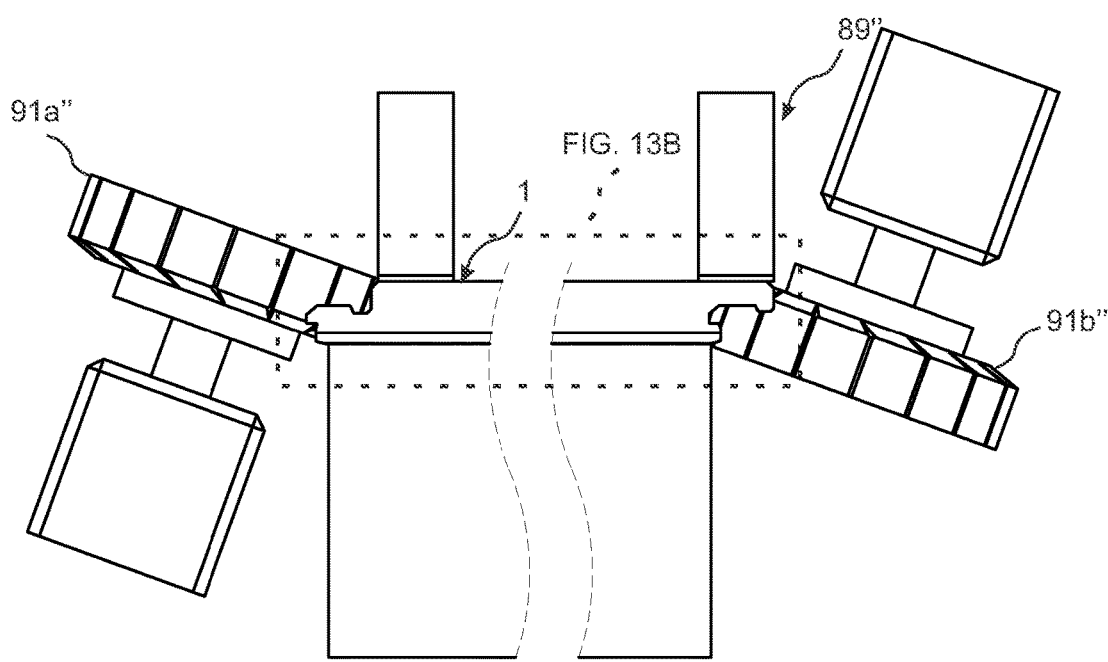
FIG. 13A illustrates a step of yet another calibrating method to create the intended edges of a building panel, according to an embodiment of the inventive concept.
Figure 13B:
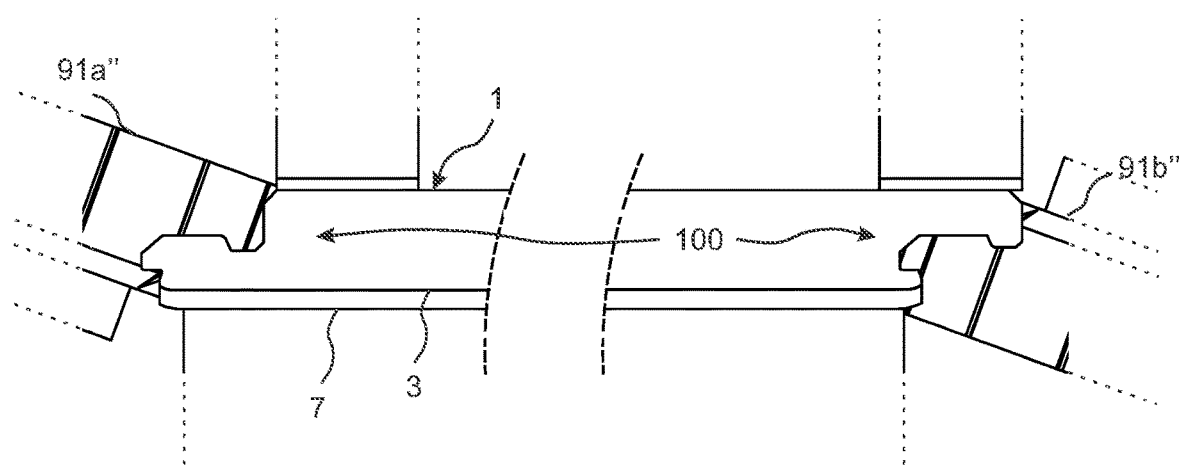
FIG. 13B is a detailed view of FIG. 13A, FIG. 13C schematically illustrates a side view of a cross section of the building panel after the step in FIG. 13A, FIG. 14A schematically illustrates a first step of a method to create the intended edges of a building panel, according to an embodiment of the inventive concept.
Figure 13C:
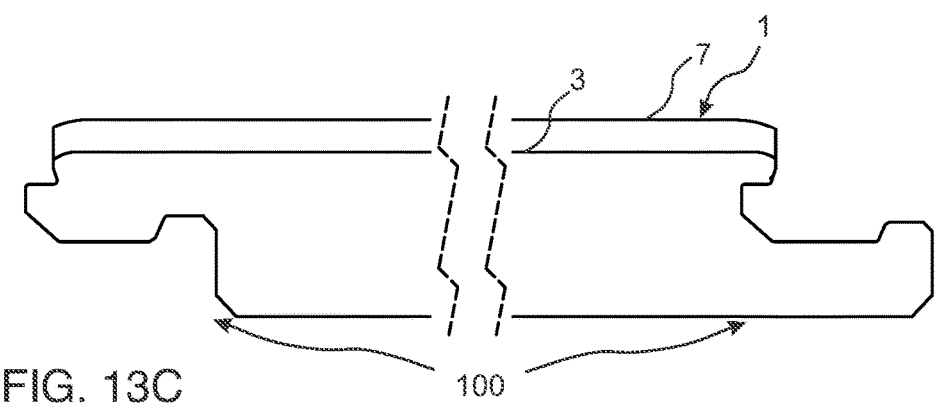
Figure 14A:
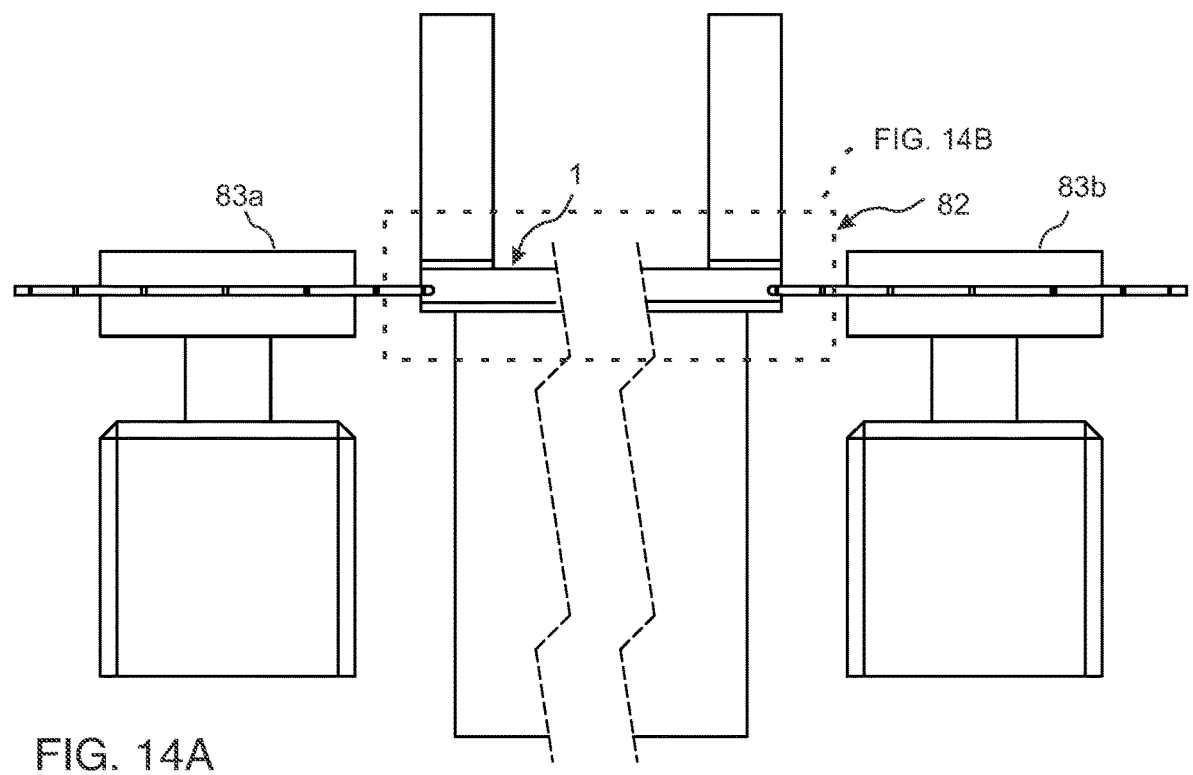
FIG. 14B is a detailed view of FIG. 14A, FIG. 14C schematically illustrates a side view of a cross section of the building panel after the first step in FIG. 14A, FIG. 15A schematically illustrates a second step of a method to create the intended edges of a building panel, according to an embodiment of the inventive concept.
Figure 14B:
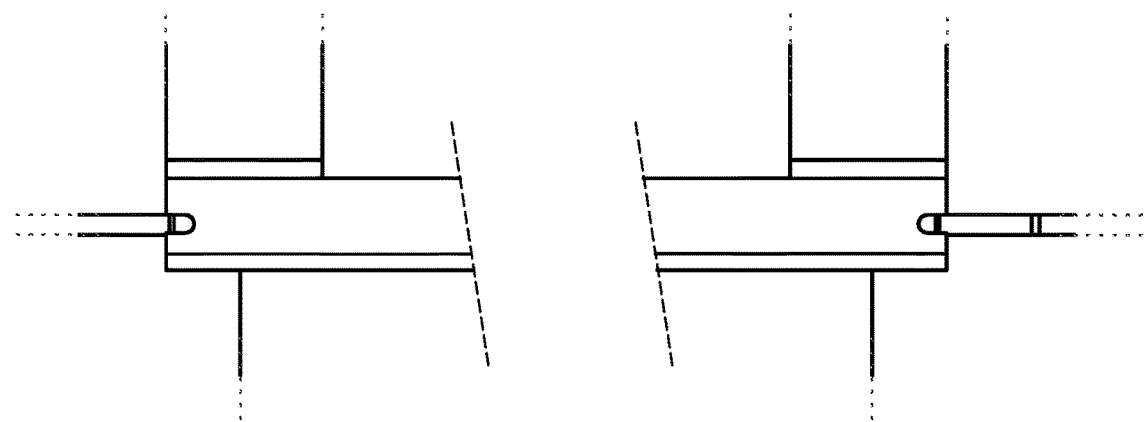
Figure 14C:
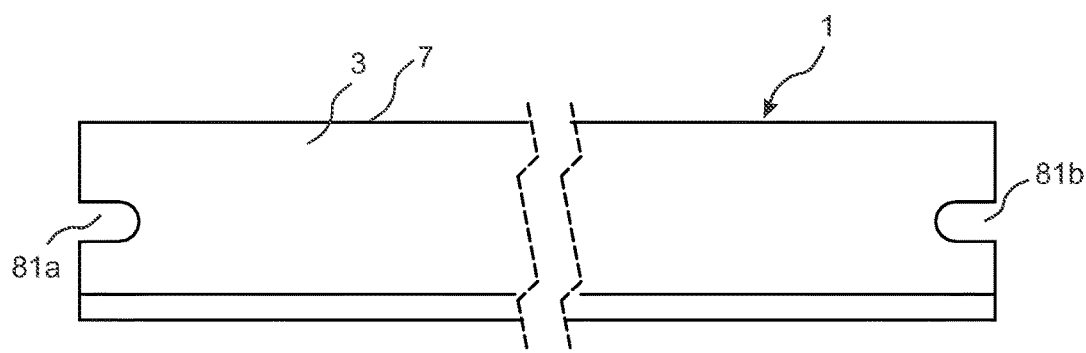
Figure 15A:
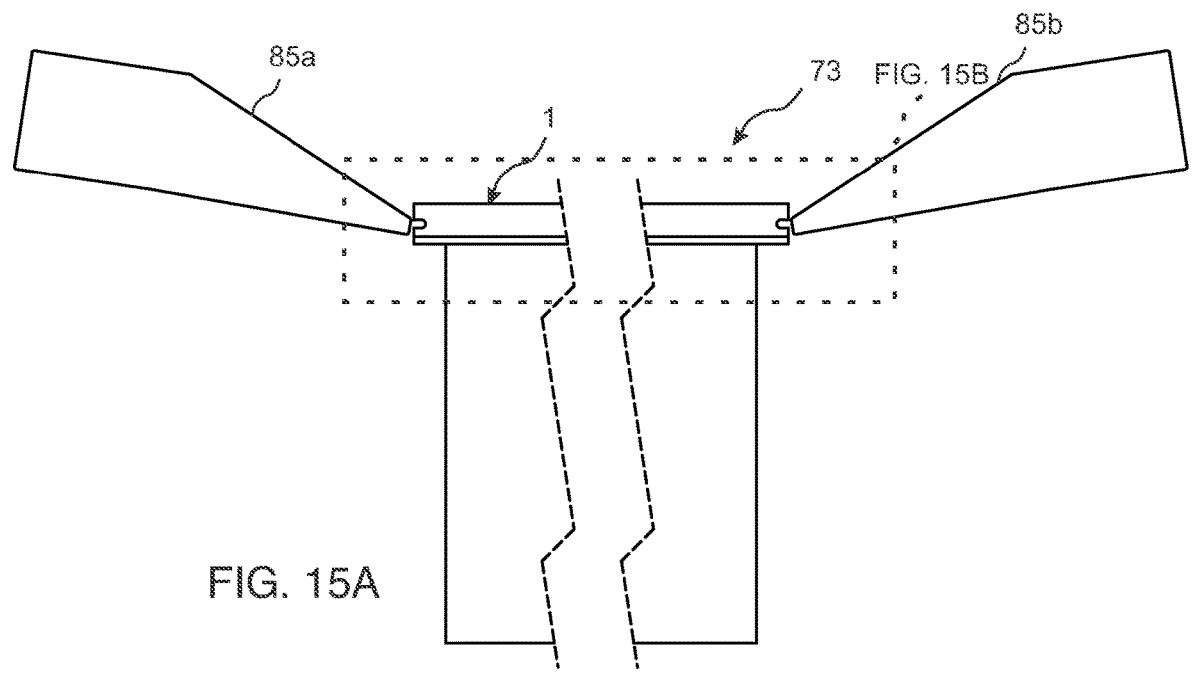
FIG. 15B is a detailed view of FIG. 15A, FIG. 16A schematically illustrates a third step of a method to create the intended edges of a building panel, according to an embodiment of the inventive concept.
Figure 15B:
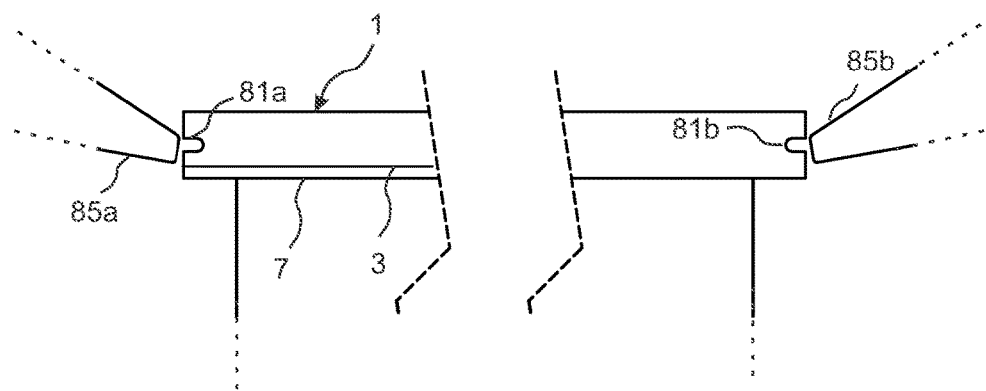

Each milling device 83a, 83b is configured to create the indentations 81a, 81b in the substrate 3 at the edge portion 20, 20', but if desired also in the surface layer 7. One of the milling devices 83b is further configured to remove material from the substrate 3 at the edge portion 20, 20' in order to prepare for the intended mechanical locking device 100 as illustrated in FIGS. 13A-13C.

The indentations 81a, 81b are located at a distance from the front surface 8 in a direction substantially perpendicular to the front surface 8. The indentations 81a, 81b may extend into the substrate 3 or into both the substrate 3 and the surface layer 5, in a direction substantially parallel to the front surface 8.

FIGS. 8A-8B and 15A-15B illustrate the next possible process which is a heating process 73. The heating process 73 is configured to heat an area along each edge of the building panel 1 necessary, to be able to form the bevel 10 in a later stage.

In an alternative set up for a process of forming the bevel (not shown), the heating process may be excluded, and the building panel is transported directly from the heat and pressure process when forming the building panel to the bevel forming process. In that set up the heat used when forming the building panel is used for forming the bevel, i.e. the area along the edges of the building panel, is still sufficiently hot for conducting the bevel forming process.

In another alternative set up for a process of forming the bevel (not shown), the heating process may be included in the bevel forming process, i.e. the two processes are not separate processes but incorporated with the bevel forming process in a combined heating and bevel forming process.

Thus, there are a multiple possible set ups for the manufacturing process, e.g. the bevel 10 is created simultaneously as the building panel is formed by means of heat and pressure (described below), or the bevel 10 is formed in a process subsequent of the process forming the building panel 1 but where the heat used in the process of forming the building panel 1 is sufficient for the subsequent bevel forming process, or the bevel 10 is formed in a process subsequent of the process forming the building panel 1 where the bevel forming process includes heating at least the area of the building panel 1 in which the bevel is to be created, or even having a bevel forming process without heat, just using pressure to form the bevel 10.

However, in the illustrated heating process 73 there is provided one heating device 85*a*, 85*b* on each side of the building panel 1. Each heating device 85*a*, 85*b* is configured to heat an area in the edges of the building panel 1 in which the bevel is to be formed. The area which is heated on both sides preferably has a radius of at least 50% of the distance of which the indentation 81*a*, 81*b* extends into the building panel 1 from the opening of it. The temperature of the material in the area in which the bevel 10 is to be formed is preferably at least 40-220° C. or 70-180° C. and it may depend on various properties, such as the thickness of the material, the type of material. The heating devices 85*a*, 85*b* may use IR or UV-heating, hot air, laser, ultra sound or contact heat for heating the area.

After the area has been heated in the heating process 73 the bevel 10 of the building panel 1 may be formed in a bevel forming process 75, see FIGS. 9A-9C and 16A-16C. The bevel forming process 75 may begin with guiding the edges of the building panel 1 into the bevel forming process 75, e.g. by means of a guiding surface. The bevel forming process 75 is configured to form the bevel 10 either from above, i.e. the surface facing upwards, or from underneath, i.e. the surface facing down as can be seen in FIGS. 9A-9B and 16A-16B, by pressing on or shaping the surface layer 7 by means of a shaping device 77*a*, 77*b*, one on each side of the building panel 1. The shaping device 77*a*, 77*b* may be a pressing device.

Figure 9A:
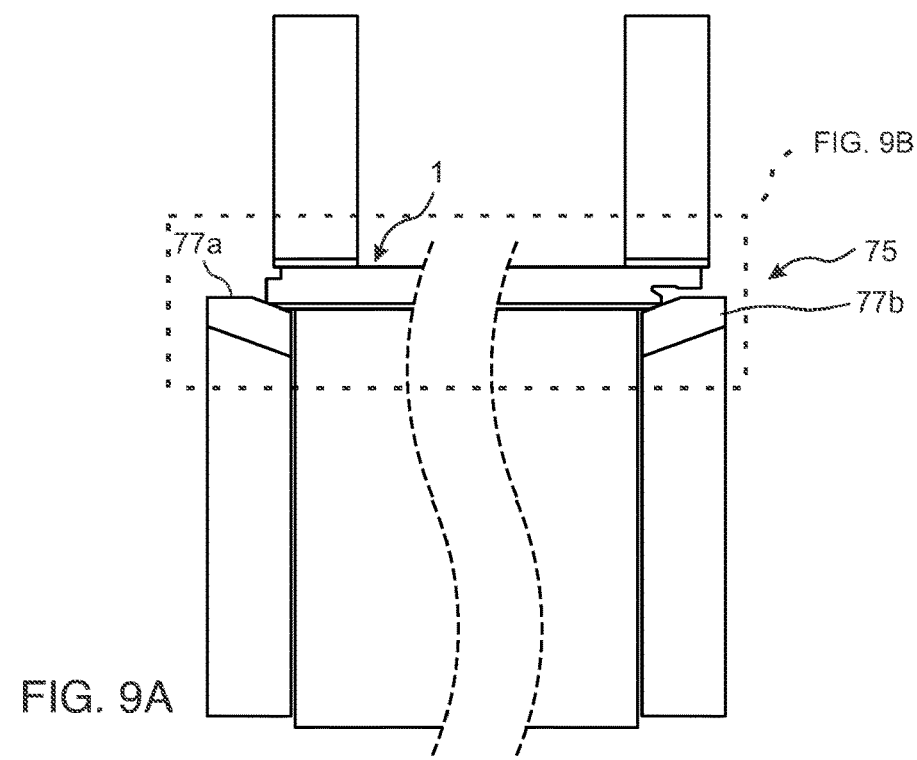
FIG. 9B is a detailed view of FIG. 9A, FIG. 9C schematically illustrates a side view of a cross section of the building panel after the third step in FIG. 9A, FIG. 10A schematically illustrates a fourth step of a method to create the intended edges of a building panel, according to an embodiment of the inventive concept.
Figure 9B:
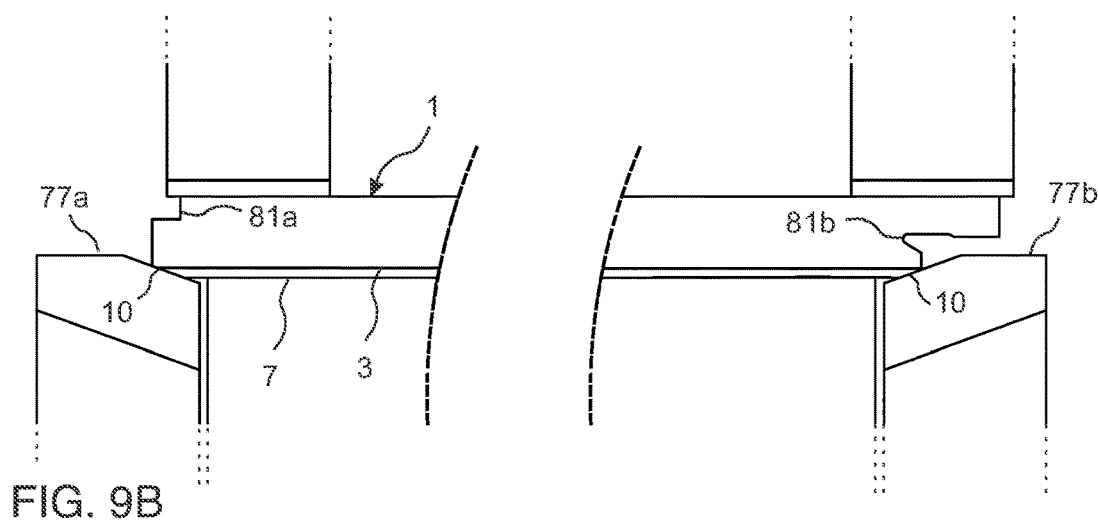
Figure 9C:
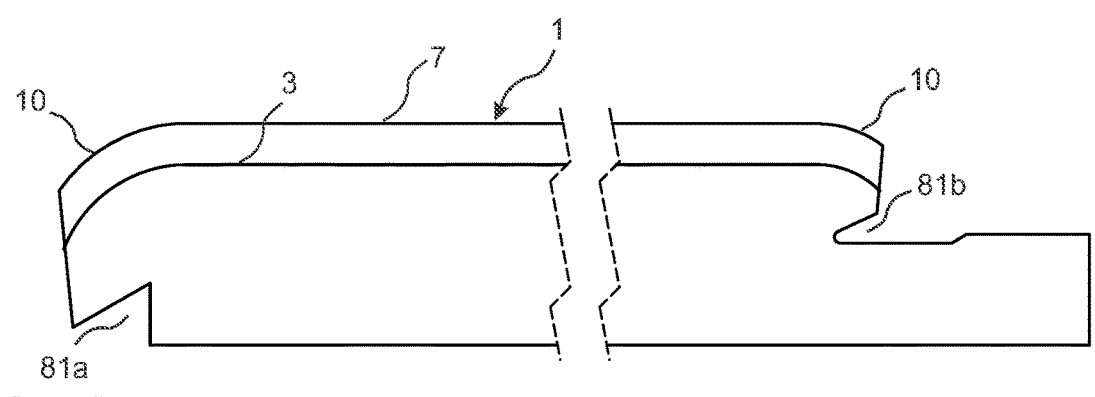
Figure 10A:
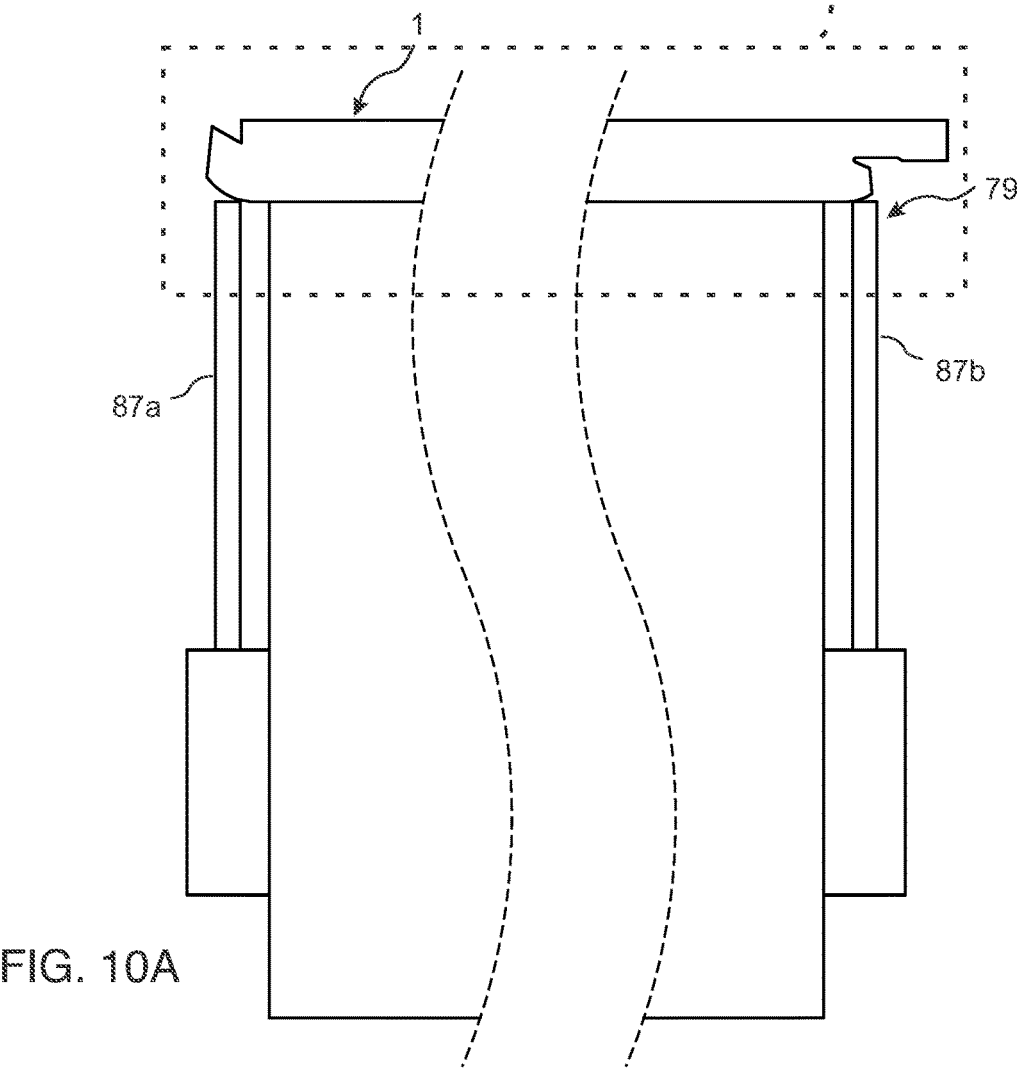
FIG. 10B is a detailed view of FIG. 10A, FIG. 11A schematically illustrates a step of a calibrating method to create the intended edges of a building panel, according to an embodiment of the inventive concept, FIG. 11B schematically illustrates a side view of a cross section of the building panel after the step in FIG. 11A, FIG. 12A schematically illustrates a step of another calibrating method to create the intended edges of a building panel, according to an embodiment of the inventive concept, FIG. 12B schematically illustrates a side view of a cross section of the building panel after the step in FIG. 12A.
Figure 10B:
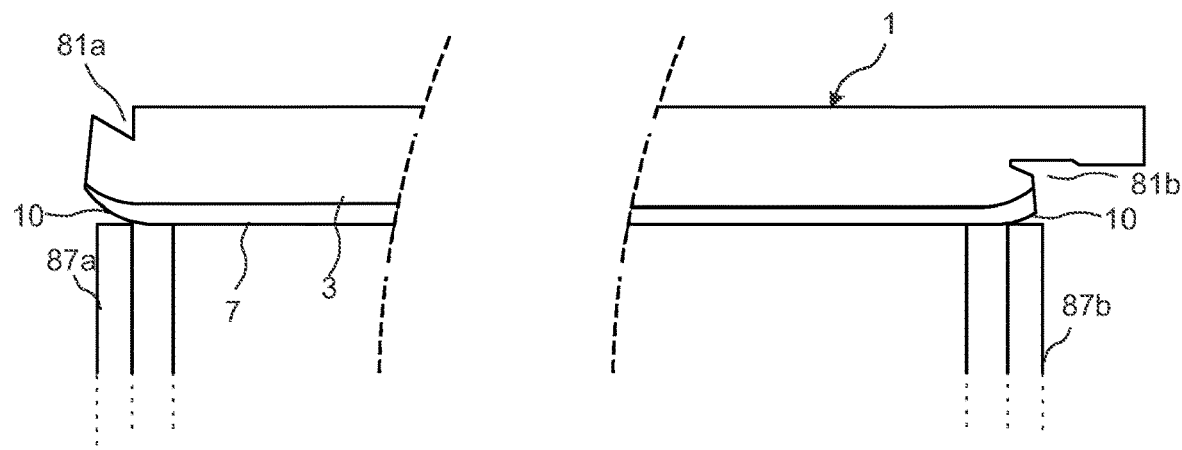
Figure 16A:
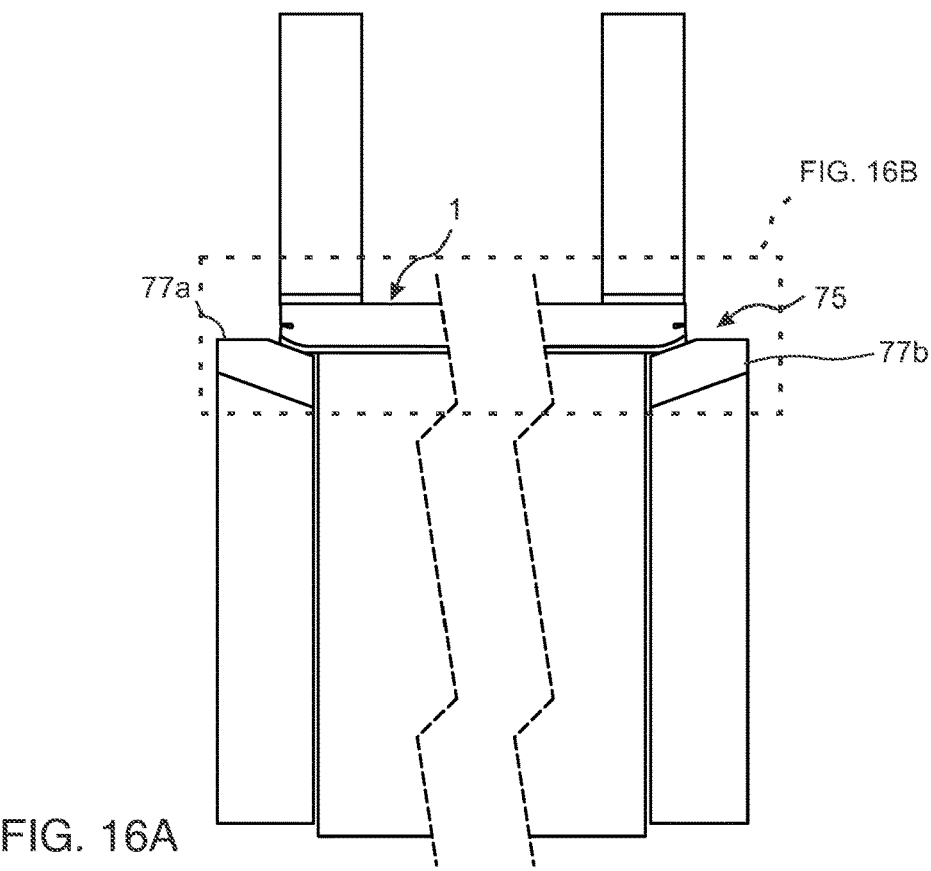
FIG. 16B is a detailed view of FIG. 16A, FIG. 16C schematically illustrates a side view of a cross section of the building panel after the third step in FIG. 16A, FIG. 17A schematically illustrates a fourth step of a method to create the intended edges of a building panel, according to an embodiment of the inventive concept.
Figure 16B:
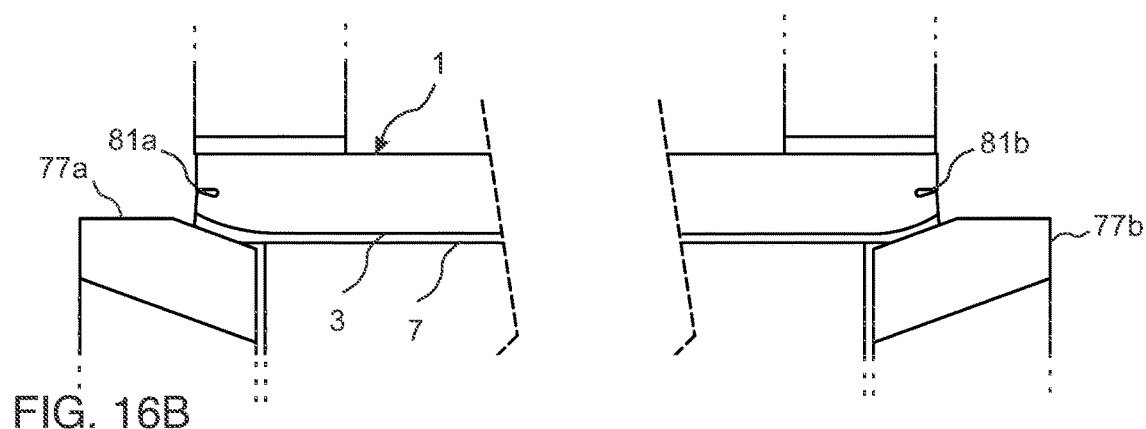
Figure 16C:
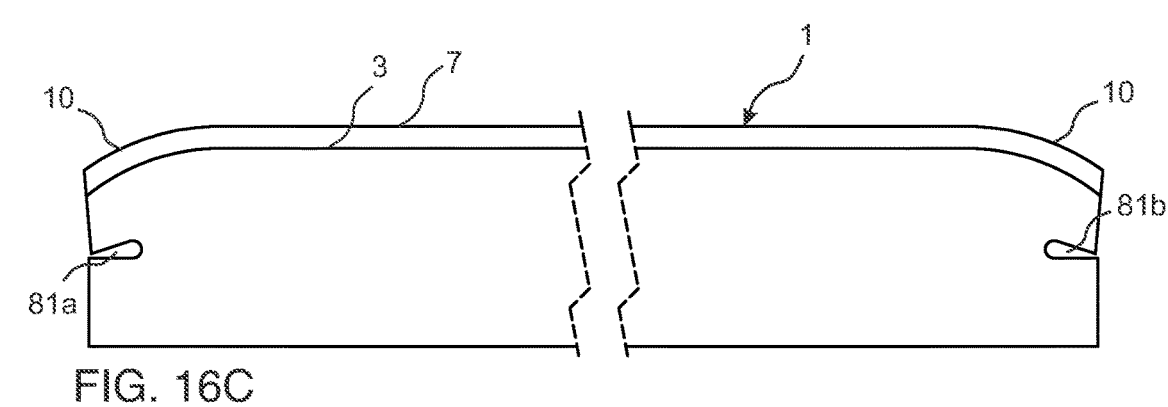

Each shaping device 77*a*, 77*b* is configured to shape and press the surface layer 7 and in some embodiments at least partially the substrate 3 upwards (since it is processed up-side-down). During the shaping of the bevels 10, the shaping devices 77*a*, 77*b* press the material in each area, which may have been heated in the previous step, on each side of the building panel 1, where the bevel is to be formed in a direction towards the indentations 81*a*, 81*b*. Thus the volume of the indentations 81*a*, 81*b* is decreased during the bevel forming process 75. The formed bevels 10 and the indentations 81*a*, 81*b* with decreased volume are illustrated in FIG. 9C and FIG. 16C.

The indentations 81*a*, 81*b* thereby allow the surface layer 7 and at least partly the substrate 3 to be pressed towards back surface 4 of the building panel 1 such that the bevel 10 can be formed.

An alternative method (not shown) to the above described bevel forming process is to press the bevel 10 of the building panel 1 simultaneously as forming the building panel itself and joining the layers, i.e. the substrate and the surface layer, together. The at least one bevel 10 may be created with the same pressing device as used for forming the building panel. The pressing device may then preferably be provided with features, e.g. protrusions, for creating such bevel.

FIGS. 17A and 17B illustrate a cooling process 79 which is a preferred process step after or during forming the bevel 10 of the building panel 1. If performed after forming the bevel 10 the cooling process 79 is arranged in the vicinity of the bevel forming process 75, for cooling the bevel 10 and the area in the edges in which the bevel 10 has been formed.

On each side of the building panel 1 there is provided a cooling device 87*a*, 87*b* configured to cool respective bevel 10 and area in the edges of the building panel 1. The cooling process is advantageous in order to prevent an undesirable elasticity and/or recovery effect in the material of the bevel 10 and in order to maintain the shape and proportions of the bevel 10.

FIGS. 11A and 11B, FIGS. 12A and 12B, and FIGS. 13A and 13B illustrate three different types of calibrating processes, i.e. final edge shaping processes, through which the building panel 1 might go through.

The indentations 81*a*, 81*b* are preferably temporary features of the edge 15, 16, 17, 18 of the building panel 1 which after a calibrating process, are no longer present in their original shape.

Figure 11A:
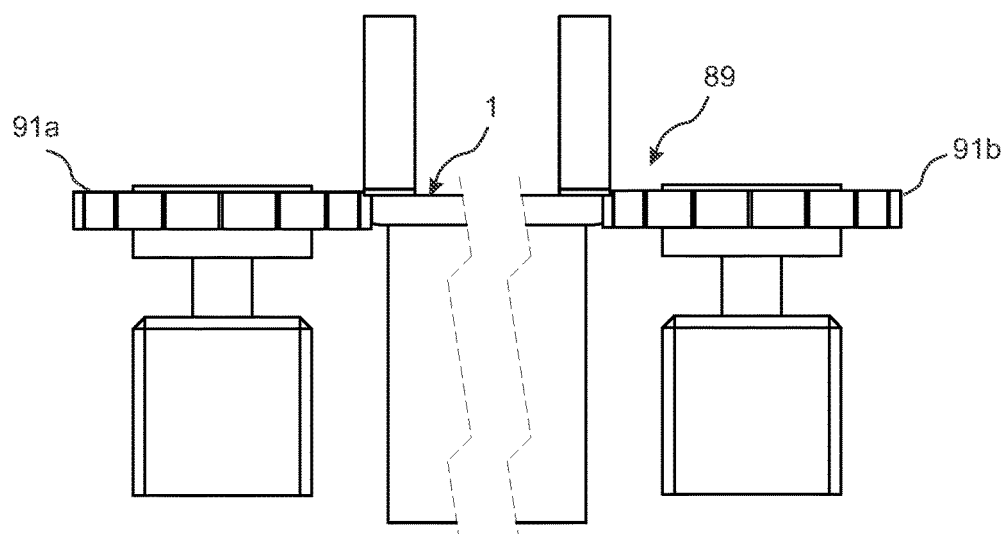
Figure 11B:
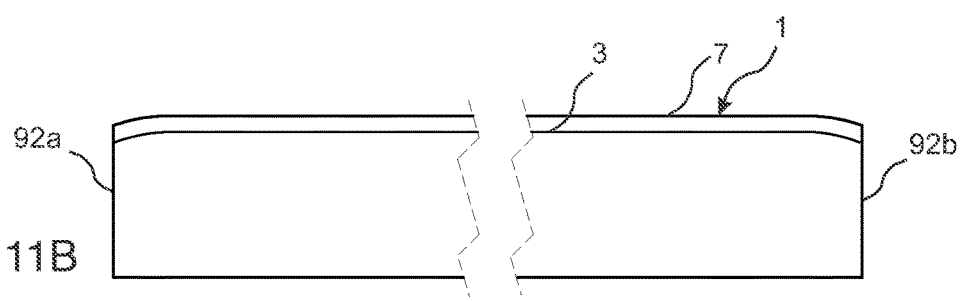

FIGS. 11A and 11B illustrate a first calibrating process including a second milling process 89 having a milling device 91*a*, 91*b* arranged on each side of the building panel 1. The milling devices 91*a*, 91*b* are configures to create a straight surface 92*a*, 92*b* along the edges of the building panel 1 as can be seen in FIG. 11B. The surfaces 92*a*, 92*b* of the edges extend in a direction perpendicular to the front surface 8. The surfaces 92*a*, 92*b* along the edges are preferably continuous surfaces.

If the building panel 1 was processed by the first milling process creating the indentation 81*a*, 81*b* then features of the indentations, e.g. gaps or similar, are no longer present after the calibrating process of creating the straight surfaces 92*a*, 92*b* of the edges. Further, the second milling process 89 is configured to create the desirable length of the bevel 10 and remove excess material from each edge of the building panel 1.

Figure 18A:
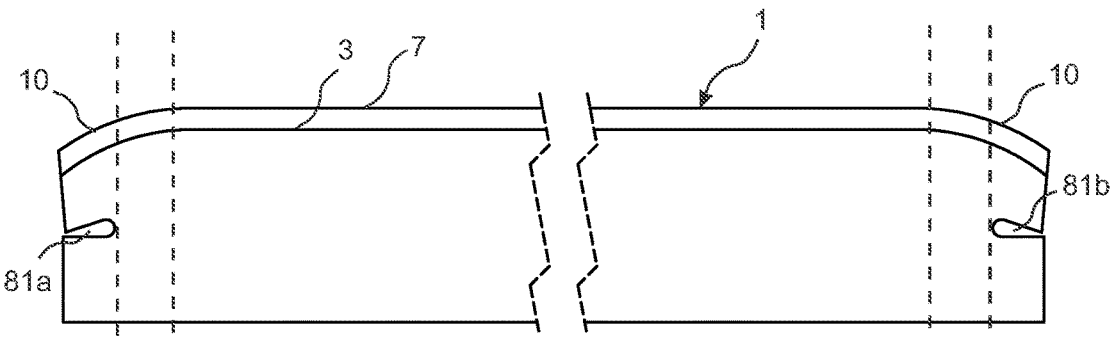
Figure 18B:
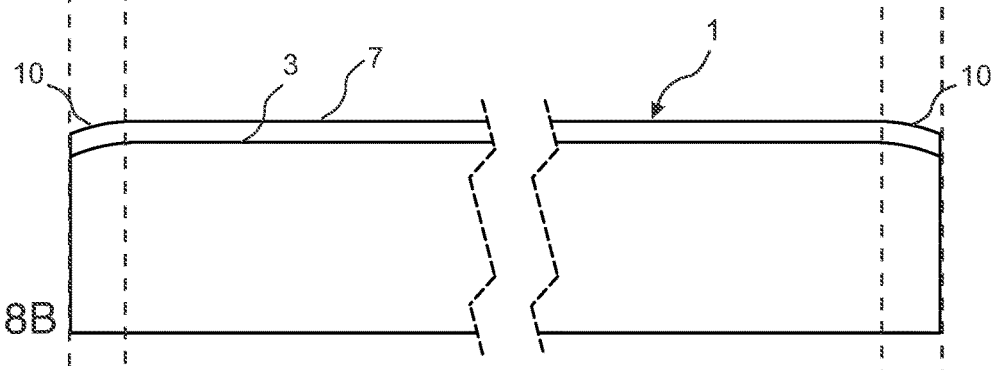

A comparison between a cross section after the bevel has been formed and a cross section after the calibrating process described with reference to FIGS. 11A and 11B is illustrated in FIGS. 18A and 18B.

Figure 12A:
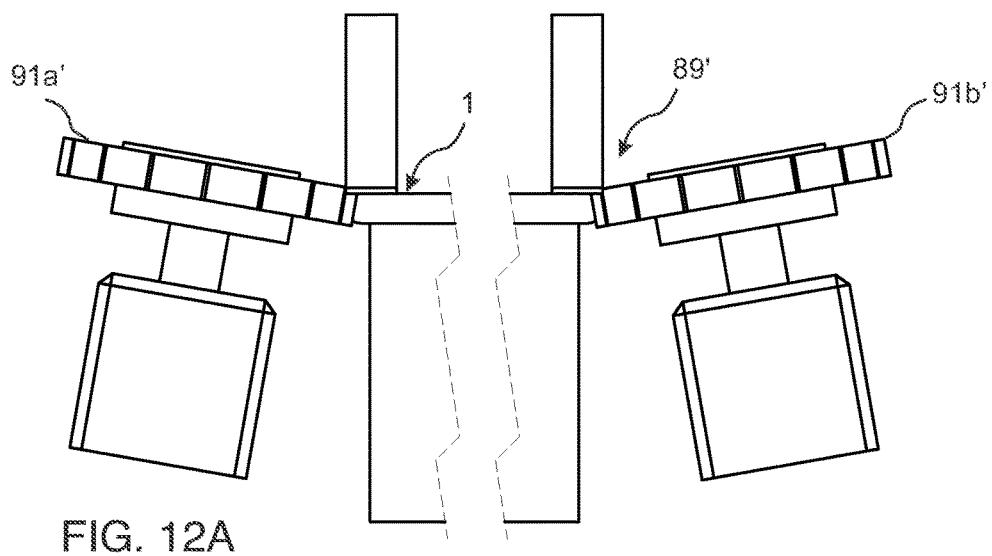
Figure 12B:
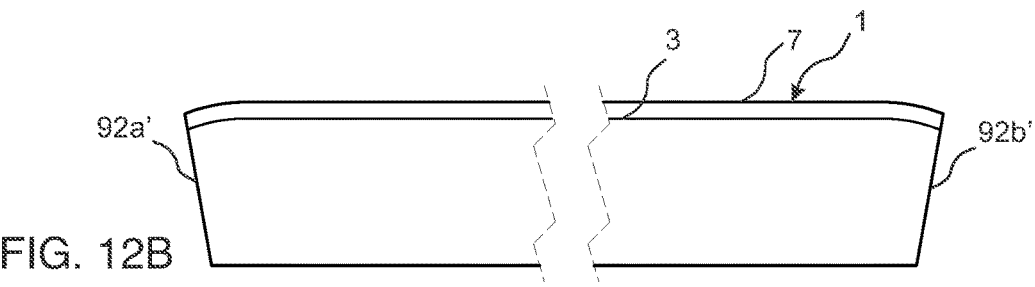

FIGS. 12A and 12B illustrate a second calibrating process including an alternative second milling process 89' having a milling device 91*a*', 91*b*' arranged on each side of the building panel 1. The milling devices 91*a*', 91*b*' are configured to create an angled surface 92*a*', 92*b*' along the edges of the building panel 1 as can be seen in FIG. 17B. The surfaces 92*a*', 92*b*' of the edges extend in a direction tilting inwards from the front surface 8 to the back surface 4 of the building panel 1. The surfaces 92*a*', 92*b*' along the edges are preferably continuous surfaces.

If the building panel 1 was processed by the first milling process creating the indentation 81*a*, 81*b* then features of the indentations, e.g. gaps or similar, are no longer present after the calibrating process of creating the angled surfaces 92*a*', 92*b*' of the edges. Further, the second milling process 89' is configured to create the desirable length of the bevel 10 and remove excess material from each edge of the building panel 1.

Figure 18C:
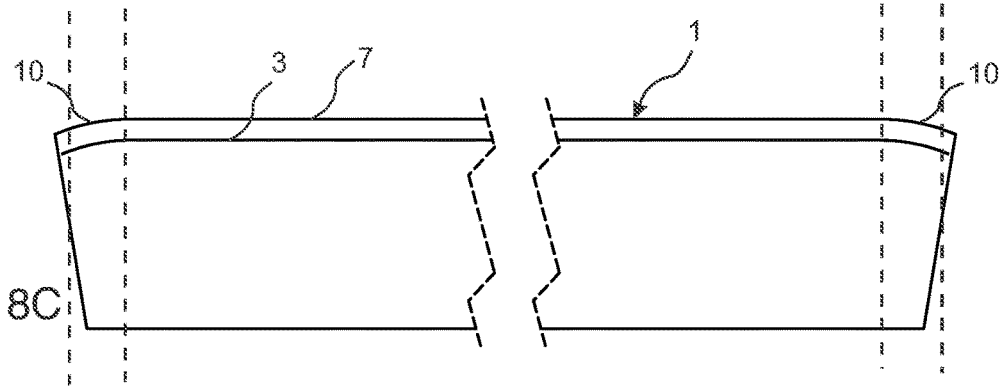

A comparison between a cross section after the bevel has been formed and a cross section after the calibrating process described with reference to FIGS. 12A and 12B is illustrated in FIGS. 18A and 18C.

FIGS. 13A-13C illustrate a third calibrating process including another alternative second milling process 89". This second milling process 89" may include one or several milling devices 91*a*", 91*b*" although two are illustrated in FIGS. 13A-13C. This second milling process 89" has a milling device 91*a*", 91*b*" arranged on each side of the building panel 1. The milling devices 91*a*", 91*b*" are configured to create a mechanical locking device 100, 100' along the edges of the building panel 1. One type of mechanical locking device 100 is illustrated in FIG. 13C. Other possible types of mechanical locking devices 100, 100' are described with reference to FIGS. 3A-5C. Depending on what type of mechanical locking device 100, 100' is to be created one or several milling devices 91a″, 91b″ are present within the second milling process 89″.

If the building panel 1 was also processed by the first milling process creating the indentation 81a, 81b then features of the indentations, e.g. gaps or similar, are no longer present after the calibrating process of creating the mechanical locking device 100, 100'. Further, the second milling process 89″ is configured to create the desirable length of the bevel 10 and remove excess material from each edge 15, 16 of the building panel 1.

In the embodiments described above, the bevel 10 may be provided with an embossing or structure. In an embodiment, the shaping device 77a, 77b for forming the bevel 10 may be configured to press an embossed pattern or a structure into the bevel during the forming of such. E.g. it may be desirable to have an embossing in the bevel following a specific pattern in a decorative layer of the surface layer for e.g. enhancing the decorative properties of the decorative layer in the bevel.

Example

In order to measure the thermal conductivity of the layers a thermal conductivity analyzer TCi from C-therm was used, (model/serial #TH91-13-00729 with sensor H461). The test was performed by dropping three drops of water onto the sensor with a pipette then putting the sample centered on the sensor with a 500 g weight on top to secure that the sample is in place during the measurements. After that the test was started. Ten measurements per sample were performed.

Example: Substrate with a Thermoplastic Material and Inorganic Filler

In order to measure the thermal conductivity of the substrate a thermal conductivity analyzer TCi from C-therm was used, (model/serial #TH91-13-00729 with sensor H461). The test was performed by dropping three drops of water onto the sensor with a pipette then putting the sample centered on the sensor with a 500 g weight on top to secure that the sample is in place during the measurements. After that the test was started. Ten measurements per sample were performed.

For the testing, a PVC blend or a PP blend was mixed with different fillers of different amounts. The PVC blend recipe is defined in Table 1 and the PP blend recipe is defined in Table 2.

TABLE 1

PVC blend recipe
PVC blend recipe

| Raw material | PHR (Parts per hundred resin) | Weight % |
|---|---|---|
| Norvinyl S5745 | 100 | 68.97% |
| Baerostab CT 1228 R | 10 | 6.90% |
| Baerolub PA Special | 2 | 1.38% |
| Baerolub PA 200 | 1 | 0.69% |
| Eastman 168 | 32 | 22.06% |
| Total: | 145 | 100% |

TABLE 2

PP blend recipe
PP blend recipe

| Material | Weight % |
|---|---|
| Sabic PP FPC 100 | 78% |
| Acti-Tech 05MA18 | 22% |
| Total: | 100% |

The PVC blend, according to Table 1, of 300 g was mixed with calcium carbonate ($CaCO_3$), which is an inorganic filler often used in products such as building panels and the PP blend, according to Table 2, of 300 g was mixed with calcium carbonate ($CaCO_3$), talc or a mix of calcium carbonate ($CaCO_3$) and gas containing elements. Gas containing elements may be e.g. Expancel® which is polymer-based spheres or micro-spheres containing gas which expands under heat or glass-based bubbles, which is in this test, which are able to contain air.

Table 3 presents the correlation between the amount of the above presented fillers in a substrate and the thermal conductivity of such a substrate.

TABLE 3

Substrate with the PVC blend or PP blend and different fillers vs. thermal conductivity

| Substrate | Weight % of Filler | Thermal conductivity [W/mK] |
|---|---|---|
| PVC blend + $CaCO_3$ | 14 | 0.266 |
| PVC blend + $CaCO_3$ | 25 | 0.288 |
| PVC blend + $CaCO_3$ | 40 | 0.492 |
| PVC blend + $CaCO_3$ | 50 | 0.600 |
| PP blend + talc | 50 | 0.566 |
| PP blend + $CaCO_3$ | 50 | 0.59 |
| PP blend + $CaCO_3$ and glass bubbles | 25 ($CaCO_3$) + 25 (glass bubbles) | 0.42 |

Figure 19:
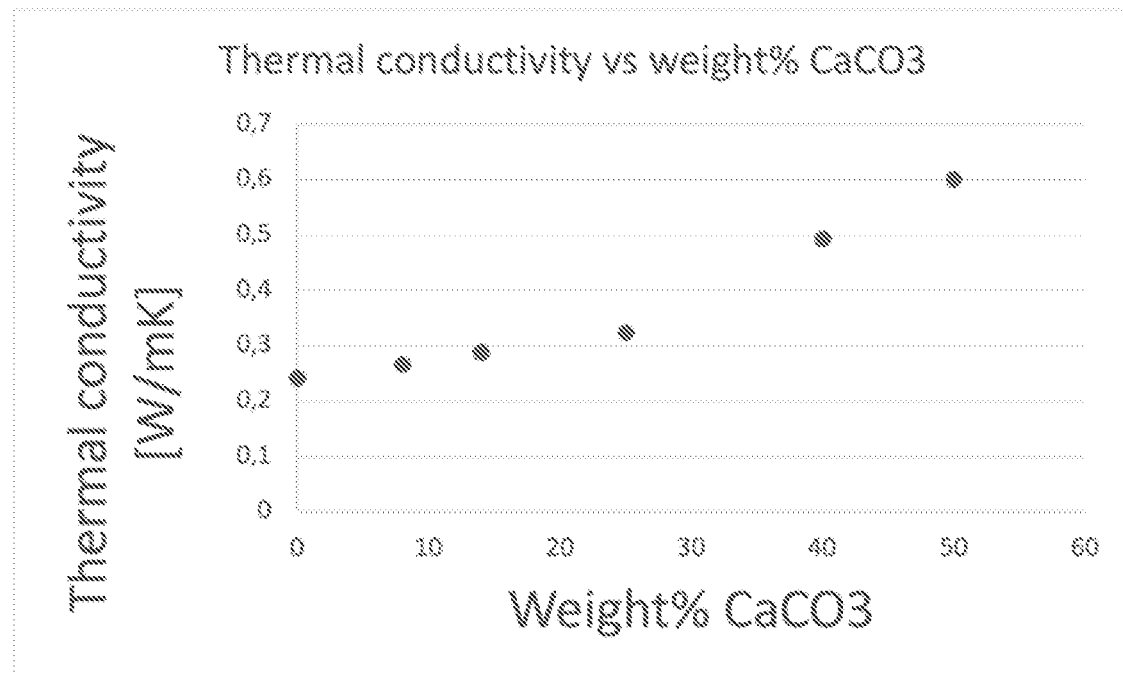
FIG. 19 is a graph illustrating the result of an example.

By studying the results in Table 3, a conclusion is drawn that more $CaCO_3$ filler increases the thermal conductivity, which is preferred for the substrate, as presented above. Yet another conclusion is that there is a correlation between the amount of $CaCO_3$ filler in the PVC blend and the thermal conductivity, which is illustrated in FIG. 19.

Finally, although the inventive concept has been described above with reference to specific embodiments, it is not intended to be limited to the specific form set forth herein. Rather, the invention is limited only by the accompanying claims. Other embodiments than the specific above are equally possible within the scope of the appended claims. All embodiments may be used separately or in combinations. Angles, dimensions, rounded parts, spaces between surfaces, etc. are only examples and may be adjusted within the basic principles of the invention.

The invention claimed is:

1. A method to manufacture a bevel at least partly along at least one edge of a building panel, wherein said building panel comprises a substrate comprising an inorganic filler of an amount of 50-85 wt % and a polymer-based material, and a surface layer, the method comprising:
   heating at least an edge portion of an edge of said building panel, along which edge the bevel is to be formed,
   forming the bevel in said edge portion by applying pressure to said edge portion, wherein said bevel is at least partly formed in said substrate,
   cooling the bevel, and removing excess material from one or more of the at least one edge of the building panel.

2. The method according to claim 1, wherein heating at least an edge portion of said building panel is performed by at least one of an IR heating device, a hot air device, a UV heating device, a laser device, an ultra sound device or a contact heat device.

3. A method to manufacture a bevel at least partly along at least one edge of a building panel, wherein said building panel comprises a substrate comprising an inorganic filler of an amount of 50-85 wt % and a polymer-based material, and a surface layer, the method comprising:
heating at least an edge portion of an edge of said building panel, along which edge the bevel is to be formed,
forming the bevel in said edge portion by applying pressure to said edge portion, wherein said bevel is at least partly formed in said substrate, and
cooling the bevel,
wherein the cooling is applied simultaneously as forming the bevel.

4. The method according to claim 1, wherein the cooling of the bevel is separate from forming the bevel.

5. A method to manufacture a bevel at least partly along at least one edge of a building panel, wherein said building panel comprises a substrate comprising an inorganic filler of an amount of 50-85 wt % and a polymer-based material, and a surface layer, the method comprising:
heating at least an edge portion of an edge of said building panel, along which edge the bevel is to be formed,
forming the bevel in said edge portion by applying pressure to said edge portion, wherein said bevel is at least partly formed in said substrate, and
cooling the bevel,
wherein the cooling is performed by at least one device using air, water, oil, heat sink or a combination thereof.

6. The method according to claim 1, wherein the substrate comprises a filler of an amount of 60-85 wt %.

7. The method according to claim 1, wherein the inorganic filler is chosen from calcium carbonate, barium sulphate, talc, gas containing elements, and/or a combination thereof.

8. The method according to claim 1, wherein the substrate has a thermal conductivity of at least 0.4 W/mK.

9. The method according to claim 1, further comprising:
creating an indentation in the edge portion of the at least one edge of the building panel, wherein the indentation is located at a distance from a surface of the building panel in which the bevel is to be formed, in a direction perpendicular to the surface of the building panel, prior to the step of heating at least an edge portion.

10. The method according to claim 9, wherein the indentation is created at least partly in said substrate.

11. The method according to claim 9, wherein the step of heating at least an edge portion of an edge of said building panel include heating at least an area between the indentation and the surface of the building panel in which the bevel is to be formed.

12. The method according to claim 1, wherein the polymer-based material of the substrate is a thermoplastic material.

13. The method according to claim 1, wherein the surface layer comprises a printed polymer-based sheet.

14. A method of manufacturing a building panel, the method comprising:
applying a surface layer on a substrate wherein the substrate comprises an inorganic filler of an amount of 50-85 wt % and a polymer-based material,
applying heat and pressure to form the building panel, and
manufacturing a bevel along at least one edge of the building panel with a method according to claim 1.

15. The method according to claim 1, wherein the removing of the excess material from the one or more of the at least one edge of the building panel includes cutting the one or more of the at least one edge to a predetermined length.

16. The method according to claim 1, wherein the removing of the excess material from the one or more of the at least one edge of the building panel includes reducing a length of the bevel.

* * * * *